(12) United States Patent
Lee et al.

(10) Patent No.: US 10,114,184 B2
(45) Date of Patent: Oct. 30, 2018

(54) OPTICAL CONNECTOR

(71) Applicant: LS Mtron Ltd., Anyang-si, Gyeonggi-do (KR)

(72) Inventors: Ick Kyoon Lee, Gunpo-si (KR); Keon Cheol Park, Gunpo-si (KR); Dong Hee Kim, Suwon-si (KR); Duk Hyun Kim, Seoul (KR); Seung Hun Lee, Seoul (KR); Yu Joon Park, Gunpo-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/539,438

(22) PCT Filed: Dec. 31, 2015

(86) PCT No.: PCT/KR2015/014581
§ 371 (c)(1),
(2) Date: Jun. 23, 2017

(87) PCT Pub. No.: WO2016/108670
PCT Pub. Date: Jul. 7, 2016

(65) Prior Publication Data
US 2017/0363829 A1    Dec. 21, 2017

(30) Foreign Application Priority Data

Dec. 31, 2014 (KR) .................. 10-2014-0195349
Dec. 31, 2015 (KR) .................. 10-2015-0191008

(51) Int. Cl.
*G02B 6/38* (2006.01)
*G02B 6/36* (2006.01)
*G02B 6/42* (2006.01)

(52) U.S. Cl.
CPC ......... *G02B 6/4295* (2013.01); *G02B 6/3604* (2013.01); *G02B 6/3885* (2013.01); *G02B 6/3893* (2013.01)

(58) Field of Classification Search
CPC .. G02B 6/4249; G02B 6/3885; G02B 6/3893; G02B 6/43; G02B 6/387; G02B 6/4295; G02B 6/3604
(Continued)

(56) References Cited

U.S. PATENT DOCUMENTS 6,551,117 B2 * 4/2003 Poplawski ........... C07D 491/22
361/752
6,821,027 B2 * 11/2004 Lee ..................... G02B 6/4249
385/89

(Continued)

FOREIGN PATENT DOCUMENTS

CN      1273367 A    11/2000
CN    102540362 A     7/2012
(Continued)

OTHER PUBLICATIONS

Search Report, dated Jun. 3, 2016, for International Application No. PCT/KR2015/014581.
(Continued)

*Primary Examiner* — Kaveh C Kianni
*Assistant Examiner* — Hung Lam
(74) *Attorney, Agent, or Firm* — K&L Gates LLP

(57) ABSTRACT

An optical connector includes: a receptacle assembly to be coupled to a substrate; a cover coupled to the receptacle assembly; a photoelectric element array coupled to the receptacle assembly; and a plug assembly inserted into a reception groove formed at the receptacle assembly, so as to be movably coupled to the receptacle assembly, wherein the cover includes a support member for supporting the plug (Continued)

assembly connected to the photoelectric element array by pressing the plug assembly.

17 Claims, 20 Drawing Sheets

(58) Field of Classification Search
USPC .......... 385/73, 81, 83, 87–89, 91, 137, 139
See application file for complete search history.

(56) References Cited

U.S. PATENT DOCUMENTS

| | | | | |
|---|---|---|---|---|
| 2006/0182442 | A1* | 8/2006 | Nagasaka | G02B 6/4214 398/41 |
| 2007/0177844 | A1* | 8/2007 | Nagasaka | G02B 6/4214 385/89 |
| 2010/0014813 | A1 | 1/2010 | Ito et al. | |

FOREIGN PATENT DOCUMENTS

| | | |
|---|---|---|
| JP | 2010-151901 A | 7/2010 |
| KR | 10-1999-0062290 A | 7/1999 |
| KR | 10-2000-0067536 A | 11/2000 |
| KR | 20-0262561 Y1 | 3/2002 |

OTHER PUBLICATIONS

Written Opinion, dated Jun. 3, 2016, for International Application No. PCT/KR2015/014581.
Chinese Office Action for related Chinese Application No. 201580071900.8; action dated Jun. 5, 2018; (9 pages).

* cited by examiner

OPTICAL CONNECTOR

BACKGROUND OF THE INVENTION

1. Field of the Invention

The present invention relates to an optical connector configured to transmit an optical signal using an optical transmission cable such as an optical fiber or the like.

2. Description of Related Art

Recently, electronic devices with high performance, high speed, integration, miniaturization, and slimness are being developed due to the development of information technology (IT). For example, electronic devices include smart phones, smart TVs, computers, tablet personal computers (PCs), displays, digital cameras, camcorders, MP3s, game machines, navigation systems, etc.

Recent trends of electronic devices are demanding high-speed transmission technology for mass data of high resolution image and three-dimensional (3D) image content between boards in the device. Thus, signal attenuation, noise, electromagnetic interference (EMI)/electromagnetic compatibility (EMC), impedance matching, crosstalk, skew, miniaturization for connecting wires, and the like are becoming big issues.

Generally, copper-based wirings, i.e., electrical connectors, are used for data transmission in a device. However, the copper-based wirings do not meet the needs of high-speed mass data transmission and do not solve various technical issues that meet the above-described recent trends of electronic devices.

Recently, optical wiring technology has been researched and developed as a technology to solve the above problems. That is, optical wiring can support high-speed mass data transmission by replacing dozens of channels of parallel electrical signal lines with serial optical signal lines, and also solves technical problems such as noise, EMI/EMC, impedance matching, crosstalk, skew, miniaturization for connecting wires, etc.

Generally, an optical connector having a photoelectric conversion function is used for connecting an optical signal line to a board included in a device. An optical connector according to the conventional art includes a receptacle assembly mounted on a board included in a device and a plug assembly coupled to the receptacle. In such an optical connector according to the conventional art, there is a problem in that, since a fixing structure of the plug assembly with respect to the receptacle assembly is complicated, it is difficult to realize miniaturization and low height.

SUMMARY OF THE INVENTION

The present invention is directed to providing an optical connector having an improved structure capable of realizing miniaturization and low height.

The present invention may include the following configurations to solve the above technical problem.

One aspect of the present invention provides an optical connector including: a receptacle assembly to be coupled to a substrate; a cover coupled to the receptacle assembly; a photoelectric element array coupled to the receptacle assembly; and a plug assembly inserted into a reception groove formed in the receptacle assembly and movably coupled to the receptacle assembly.

In the optical connector according to the present invention, the plug assembly may include a plug body inserted into the reception groove to be movable between a first position spaced apart from the photoelectric element array and a second position connected to the photoelectric element array, and a hook member formed to protrude from the plug body.

In the optical connector according to the present invention, the cover may include a support member which presses the plug assembly in a first direction from the first position toward the second position and supports the plug assembly connected to the photoelectric element array.

In the optical connector according to the present invention, the receptacle assembly may include a receptacle body in which the reception groove is formed, a protruding member formed on the receptacle body to protrude toward the reception groove, and a hook groove formed in the protruding member.

In the optical connector according to the present invention, the hook member may be inserted into the hook groove as the plug assembly is moved to the second position, and the protruding member may support the hook member inserted into the hook groove.

Advantageous Effects

According to the present invention, the following effects can be achieved.

The present invention is implemented so that a plug assembly accommodated in a receptacle assembly can transmit an optical signal, and thus miniaturization and low height can be realized, thereby improving versatility for miniaturized electronic devices.

The present invention is implemented so that a plug assembly is connected to a photoelectric element array by a sliding movement, thereby improving utilization in an operation of connecting the plug assembly and the photoelectric element array.

The present invention is implemented so that a support member presses and supports a plug assembly connected to a photoelectric element array, and thus an optical arrangement between the plug assembly and the photoelectric element array is prevented from being dislocated by an external force such as vibration, shaking, or the like, thereby improving stability in optical signal transmission performance.

DETAILED DESCRIPTION OF THE INVENTION

Figure 1:
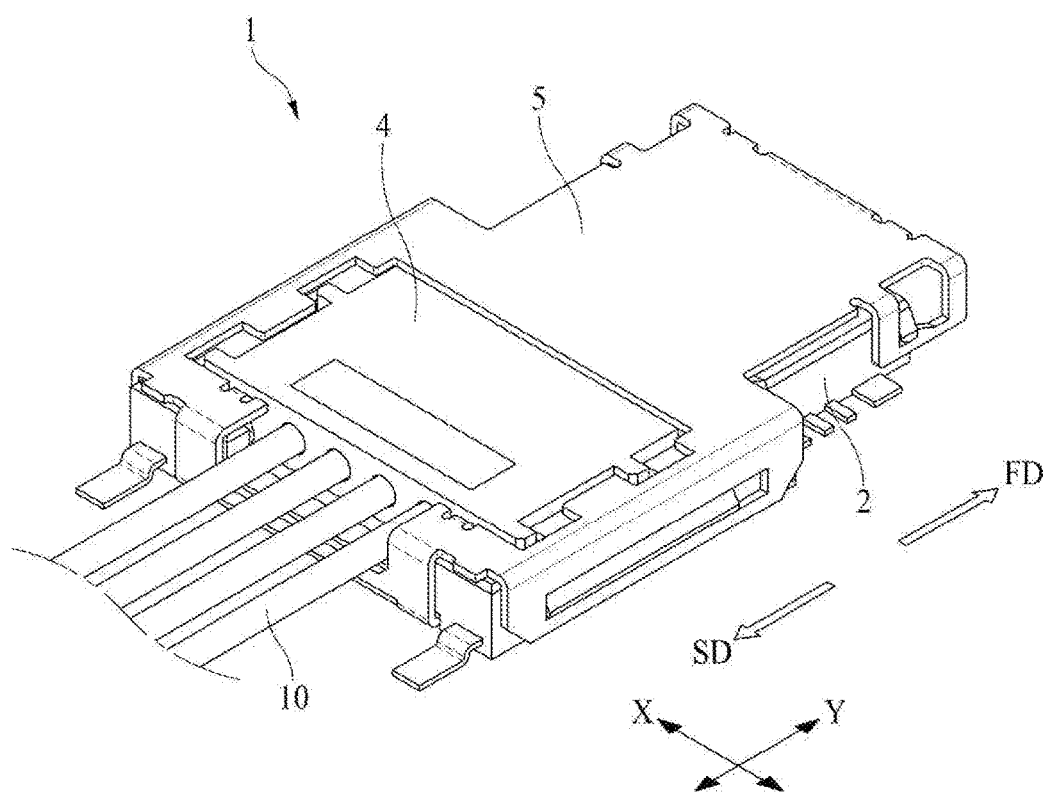
FIG. 1 is a coupled perspective view illustrating an optical connector according to the present invention.

Hereinafter, embodiments of an optical connector according to the present invention will be described in detail with reference to the accompanying drawings.

Referring to FIGS. 1 to 5, an optical connector 1 according to the present invention is used for transmitting an optical signal in an electronic device or between electronic devices. For example, the optical connector 1 according to the present invention may be applied to a display device, such as a TV or the like, a Universal Serial Bus (USB) cable, a high definition multimedia interface (HDMI), etc.

The optical connector 1 according to the present invention includes a receptacle assembly 2 coupled to a substrate (not shown), a photoelectric element array 3 coupled to the receptacle assembly 2, a plug assembly 4 movably coupled to the receptacle assembly 2, and a cover 5 coupled to the receptacle assembly 2.

The receptacle assembly 2 includes a reception groove 21 configured to accommodate the plug assembly 4. The plug assembly 4 may be inserted into the reception groove 21 to be movable between a first position P1 (see FIG. 4) and a second position P2 (see FIG. 5). When the plug assembly 4 is positioned at the first position P1, the plug assembly 4 is spaced apart from the photoelectric element array 3. When the plug assembly 4 is positioned at the second position P2, the plug assembly 4 is connected to the photoelectric element array 3.

The cover 5 includes a support member 51 configured to support the plug assembly 4. The support member 51 presses the plug assembly 4 in a first direction (a FD arrow direction). The first direction (the FD arrow direction) is a direction from the first position P1 toward the second position P2. Thus, the support member 51 supports the plug assembly 4 connected to the photoelectric element array 3.

Accordingly, the optical connector 1 according to the present invention may have the following effects.

First, the optical connector 1 according to the present invention is implemented so that the plug assembly 4 accommodated in the receptacle assembly 2 transmits an optical signal through the reception groove 21. Accordingly, miniaturization and low height of the optical connector 1 according to the present invention can be realized, and thus the optical connector 1 can have improved versatility capable of being applied to miniaturized electronic devices.

Second, the optical connector 1 according to the present invention is implemented so that the plug assembly 4 inserted into the reception groove 21 is connected to the photoelectric element array 3 by a sliding movement. Accordingly, the optical connector 1 according to the present invention may have improved utilization in a connecting operation.

Third, the optical connector 1 according to the present invention is implemented so that the support member 51 presses and supports plug assembly 4 connected to the photoelectric element array 3. Thus, the optical connector 1 according to the present invention may prevent the plug assembly 4 connected to the photoelectric element array 3 from being moved by an external force such as vibration, shaking, etc. Accordingly, since the optical connector 1 according to the present invention prevents an optical arrangement between the plug assembly 4 and the photoelectric element array 3 from being dislocated by an external force such as vibration, shaking, etc., the optical connector 1 may have improved stability in optical signal transmission performance.

Hereinafter, the receptacle assembly 2, the photoelectric element array 3, the plug assembly 4, and the cover 5 will be described in detail with reference to the accompanying drawings.

Figure 2:
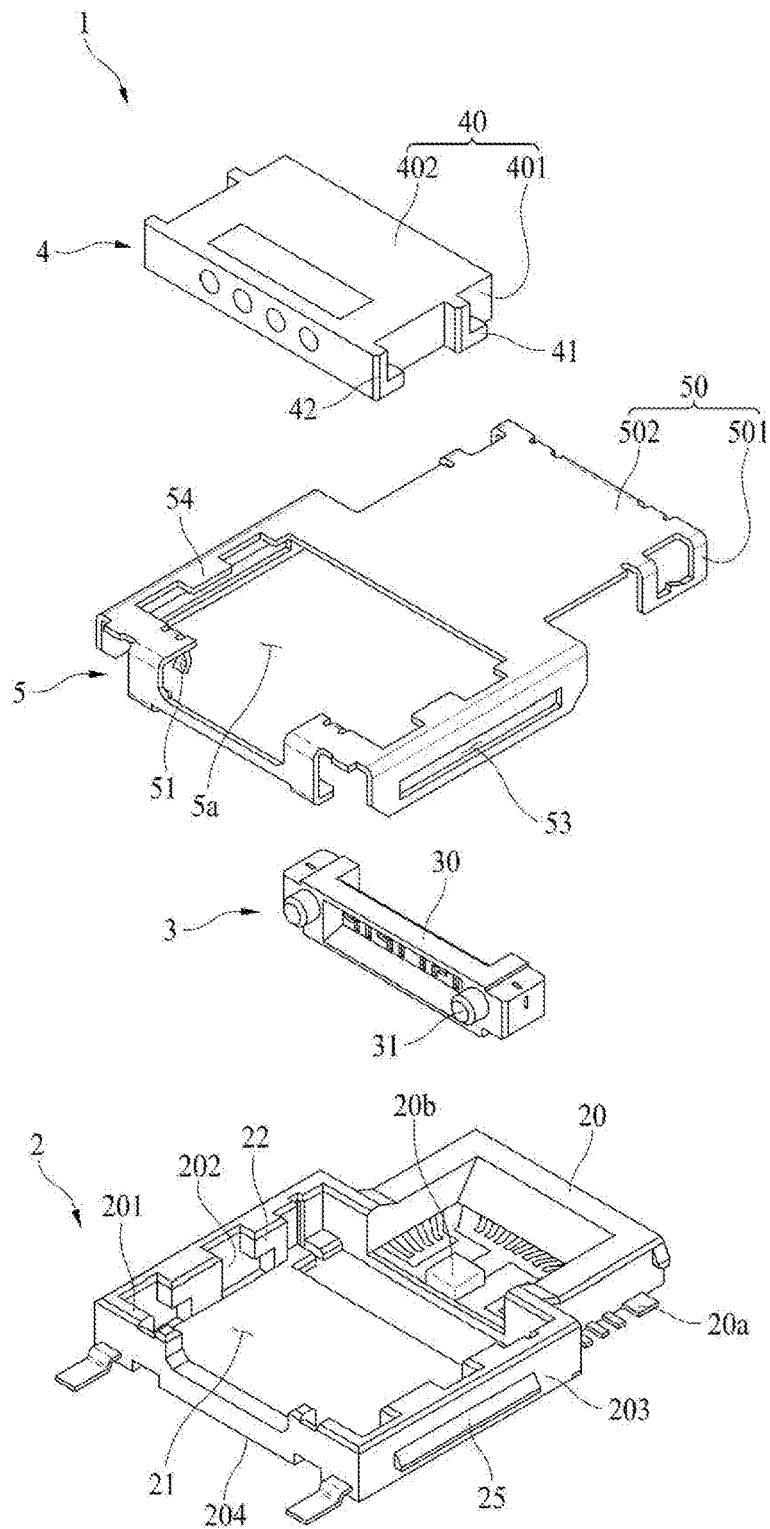
FIG. 2 is an exploded perspective view illustrating the optical connector according to the present invention.
Figure 3:
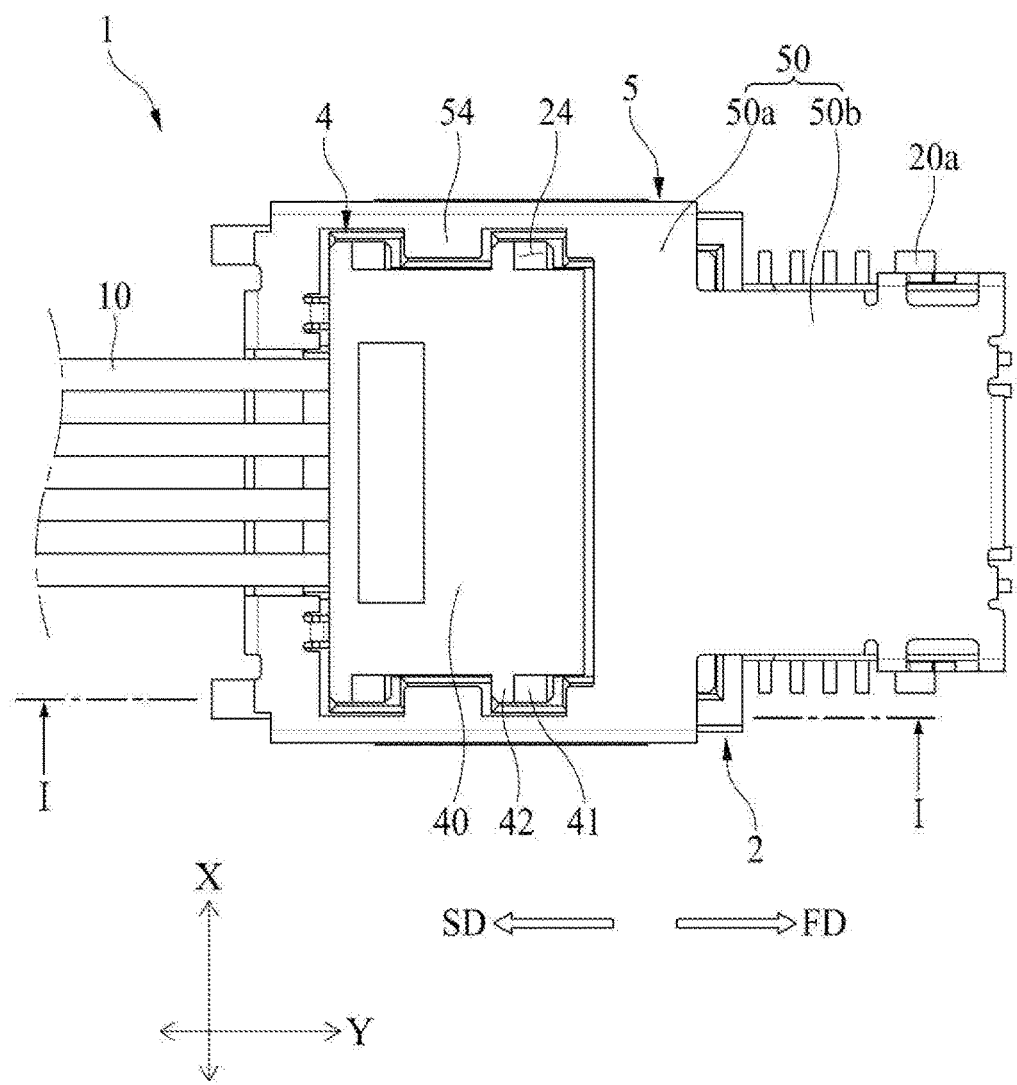
FIG. 3 is a plan view illustrating the optical connector according to the present invention.

Referring to FIGS. 1 to 3, the receptacle assembly 2 supports the photoelectric element array 3, the plug assembly 4, and the cover 5. The receptacle assembly 2 is coupled to the substrate.

The receptacle assembly 2 includes the reception groove 21. The photoelectric element array 3 and the plug assembly 4 may be accommodated in the reception groove 21. The plug assembly 4 inserted into the reception groove 21 may be moved in the first direction (the FD arrow direction shown in FIG. 3) and in a second direction (an SD arrow direction shown in FIG. 3). The plug assembly 4 may be moved in the first direction (the FD arrow direction) and connected to the photoelectric element array 3. The plug assembly 4 may be moved in the second direction (the SD arrow direction) and spaced apart from the photoelectric element array 3.

The receptacle assembly 2 includes a receptacle body 20 in which the reception groove 21 is formed.

The receptacle body 20 supports the photoelectric element array 3 and the plug assembly 4. The reception groove 21 may be formed by recessing an upper surface 201 of the receptacle body 20 (see FIG. 2) to a predetermined depth.

Although the receptacle body 20 may be formed in a rectangular parallelepiped shape in which the upper surface 201 is opened by the reception groove 21, the receptacle body 20 is not limited thereto and may be formed in another shape which is a shape capable of accommodating the photoelectric element array 3 and the plug assembly 4.

The receptacle body 20 may include an inner side wall 202 (see FIG. 2) disposed facing the reception groove 21 and an outer side wall 203 (see FIG. 2) disposed outward. The plug assembly 4 may be inserted through the reception groove 21 to be positioned inside the inner side wall 202. The receptacle body 20 may include a lower surface 204 (see FIG. 2). The plug assembly 4 inserted into the reception groove 21 may be supported by the lower surface 204 of the receptacle body 20.

A plurality of lead frames 20a to be mounted on the substrate may be coupled to the receptacle body 20. The lead frames 20a are coupled to the receptacle body 20 so that one side of each of the lead frames 20a is positioned inside the receptacle body 20 and the other side thereof is positioned outside the receptacle body 20. The receptacle body 20 and the lead frames 20a may be integrally formed by insert molding.

A control element 20b (see FIG. 2) may be coupled to the receptacle body 20. The control element 20b is coupled to the receptacle body 20 to be positioned in the reception groove 21. The control element 20b may be positioned to be opposite the plug assembly 4 on the basis of the photoelectric element array 3. That is, the photoelectric element array 3 is positioned between the control element 20b and the plug assembly 4. The control element 20b is a driver integrated circuit (driver-IC) and serves to drive an optical element (not shown) included in the photoelectric element array 3.

Referring to FIGS. 1 to 3, the photoelectric element array 3 is for transmitting an optical signal. The photoelectric element array 3 is positioned between the control element 20b and the plug assembly 4. The photoelectric element array 3 is inserted into the reception groove 21 and coupled to the receptacle assembly 2. The photoelectric element array 3 may include the optical element. When the optical connector 1 according to the present invention is used as a transmitter, the optical element may include a light emitting element such as a laser diode, a vertical-cavity surface-emitting laser (VCSEL), etc. When the optical connector 1 according to the present invention is used as a receiver, the optical element may include a light receiving element such as a photo diode (PD) or the like.

The photoelectric element array 3 may include a photoelectric element body 30 to which the optical element is coupled. Although the entire photoelectric element body 30 may be formed in a rectangular parallelepiped shape, the photoelectric element body 30 is not limited thereto and may be formed in another shape which is a shape capable of being coupled to the optical element and inserted into the reception groove 21. The photoelectric element body 30 is inserted into the reception groove 21 by an interference fit method to be coupled to the receptacle body 20.

The photoelectric element array 3 may include a connection member 31. The connection member 31 is formed to protrude from the photoelectric element body 30. When the plug assembly 4 is moved in the first direction (the FD arrow direction), the connection member 31 is inserted into the plug assembly 4 and guides a coupling position of the plug assembly 4. That is, the connection member 31 has a function of guiding the plug assembly 4 and the photoelectric element array 3 to be optically arranged. The photoelectric element array 3 may include a plurality of connection members 31. The connection members 31 may be formed to be spaced apart from each other in a first axis direction (an X-axis direction). The first axis direction (the X-axis direction) is a direction perpendicular to a moving direction of the plug assembly 4 inserted into the reception groove 21. The plug assembly 4 may be moved in the first direction (the FD arrow direction) and the second direction (the SD arrow direction) on the basis of a second axis direction (a Y-axis direction). The second axis direction (the Y-axis direction) is a direction perpendicular to the first axis direction (the X-axis direction).

Referring to FIGS. 1 to 5, the plug assembly 4 may be inserted into the reception groove 21 and movably coupled to the receptacle assembly 2. As the plug assembly 4 is inserted into the reception groove 21, the plug assembly 4 may be positioned inside the receptacle assembly 2.

The plug assembly 4 may include a plug body 40.

Figure 4:
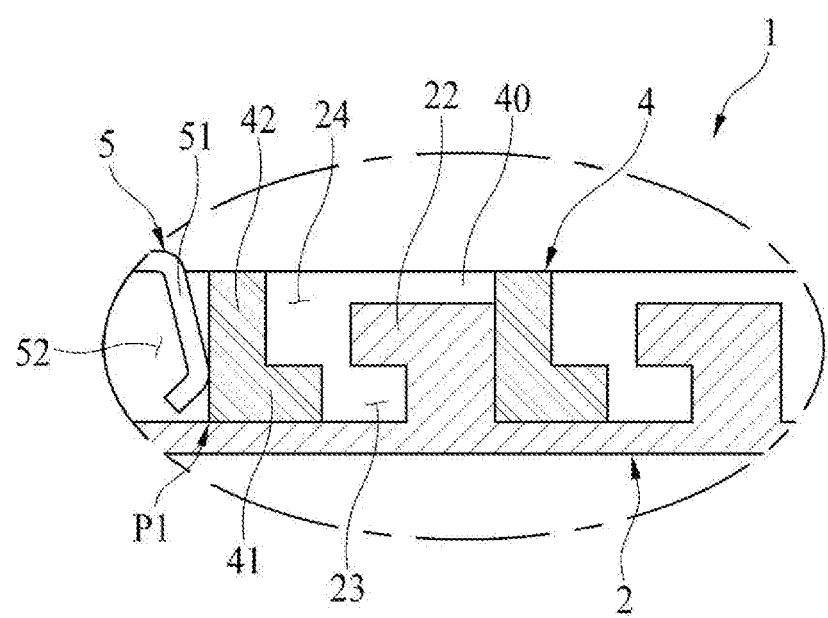
FIGS. 4 and 5 are side cross-sectional views schematically illustrating the optical connector according to the present invention on the basis of line I-I shown in FIG. 3.
Figure 5:
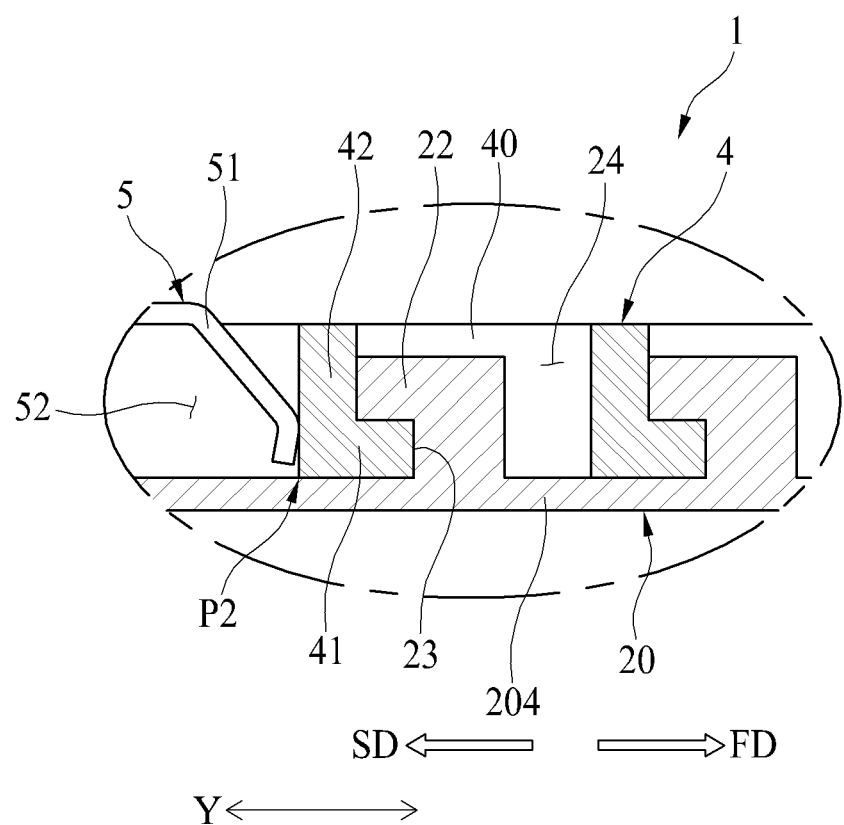

The plug body 40 may be inserted into the reception groove 21 to be movable between the first position P1 (see FIG. 4) and the second position P2 (see FIG. 5). When the plug body 40 is positioned at the first position P1, the plug body 40 is positioned to be spaced apart from the photoelectric element array 3. When the plug body 40 is positioned at the second position P2, the plug body 40 is positioned to be connected to the photoelectric element array 3. The plug body 40 may be positioned at the second position P2 by being moved from the first position P1 in the first direction (the FD arrow direction). The plug body 40 may be positioned at the first position P1 by being moved from the second position P2 in the second direction (the SD arrow direction). The reception groove 21 may be formed to have a length greater than the sum of lengths of the photoelectric element array 3 and the plug body 40 on the basis of the second axis direction (the Y-axis direction).

A plurality of optical transmission cables 10 may be inserted into the plug body 40. The optical transmission cables 10 are inserted into the plug body 40 to be disposed in the first axis direction (the X-axis direction). Although the entire plug body 40 may be formed in a rectangular parallelepiped shape, the entire plug body 40 is not limited thereto and may be formed in another shape which is a shape capable of accommodating the plurality of optical transmission cables 10 and being movably coupled to the receptacle body 20.

Figure 6:
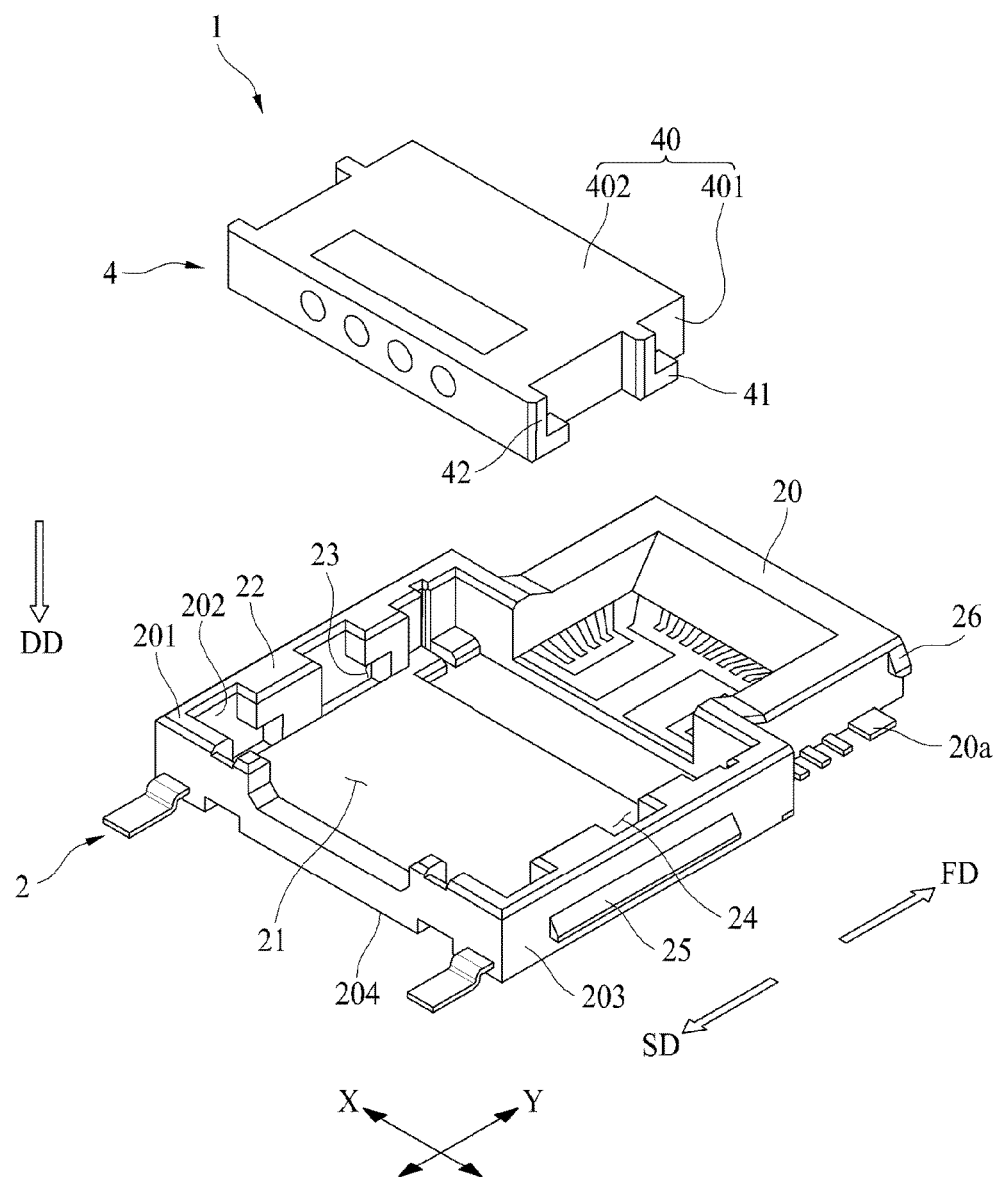
FIG. 6 is an exploded perspective view illustrating a receptacle assembly and a plug assembly in the optical connector according to the present invention.

Referring to FIGS. 4 to 6, the plug assembly 4 may include a hook member 41.

The hook member 41 is formed to protrude from the plug body 40. The hook member 41 may be formed to protrude from the plug body 40 in the first axis direction (the X-axis direction). The hook member 41 may be formed to protrude outward from a side wall 401 of the plug body 40 (see FIG. 6). Although the entire hook member 41 may be formed in a rectangular parallelepiped shape, the hook member 41 is not limited thereto and may be formed in another shape.

When the plug assembly 4 includes the hook member 41, the receptacle assembly 2 may include a protruding member 22 formed to protrude from the receptacle body 20 and a hook groove 23 (see FIG. 4) formed in the protruding member 22.

The protruding member 22 may be formed to protrude from the receptacle body 20 toward the reception groove 21. The protruding member 22 may be formed to protrude from an inner side wall 202 of the receptacle body 20 (see FIG. 6) toward the reception groove 21. Although the entire protruding member 22 may be formed in a rectangular parallelepiped shape, the protruding member 22 is not limited thereto and may be formed in another shape.

The hook groove 23 may be formed by recessing one surface of the protruding member 22 to a predetermined depth. The one surface of the protruding member 22 is a surface disposed in the second direction (the SD arrow direction). The hook groove 23 may be formed in a shape corresponding to the hook member 41. The hook member 41 may be inserted into the hook groove 23 or spaced apart from the hook groove 23 according to a position of the plug body 40.

As shown in FIG. 4, when the plug body 40 is positioned at the first position P1, the hook member 41 is positioned to be spaced apart from the hook groove 23 in the second direction (the SD arrow direction). Thus, the plug body 40 may be inserted into the reception groove 21 without interference from the protruding member 22. The plug body 40 may be separated from the reception groove 21 without interference from the protruding member 22.

As shown in FIG. 5, when the plug body 40 is positioned at the second position P2, the hook member 41 is inserted into the hook groove 23. In this case, the hook member 41 may be inserted into the hook groove 23 to be positioned between the protruding member 22 and the lower surface 204 of the receptacle body 20. Thus, the protruding member 22 may support the hook member 41 inserted into the hook groove 23.

Accordingly, since the optical connector 1 according to the present invention is implemented to more firmly fix the plug assembly 4 at the second position P2 using the hook member 41 and the protruding member 22, stability in optical signal transmission performance can further be improved. Further, in the optical connector 1 according to the present invention, the hook member 41 may be guided to be moved along the protruding member 22 during a process of moving the plug assembly 4 between the first position P1 and the second position P2. Accordingly, the optical connector 1 according to the present invention can have more improved accuracy and utilization in optical arrangement between the plug assembly 4 and the photoelectric element array 3 (see FIG. 2).

The plug assembly 4 may include a plurality of hook members 41. The hook members 41 may be formed to protrude toward both sides of the plug body 40 on the basis of the first axis direction (the X-axis direction). The hook members 41 may be formed so that the hook members 41 are positioned to be spaced apart from each other on the basis of the second axis direction (the Y-axis direction). For example, as shown in FIG. 6, two hook members 41 may be formed so that the two hook members 41 are positioned to be spaced apart from each other in the second axis direction (the Y-axis direction). When the plug assembly 4 includes the plurality of hook members 41, the receptacle assembly 2 may include the same number of protruding members 22 and hook grooves 23 as the number of hook members 41.

Referring to FIGS. 4 to 7, the plug assembly 4 may include an insertion member 42.

The insertion member 42 is formed to protrude from the plug body 40. The insertion member 42 may be formed to protrude from the plug body 40 in the first axis direction (the X-axis direction). The insertion member 42 may be formed to protrude outward from the side wall 401 of the plug body 40 (see FIG. 6). Although the entire insertion member 42 may be formed in a rectangular parallelepiped shape, the insertion member 42 is not limited thereto and may be formed in another shape.

When the plug assembly 4 includes the insertion member 42, the receptacle assembly 2 may include an insertion groove 24 formed in the receptacle body 20.

Figure 7:
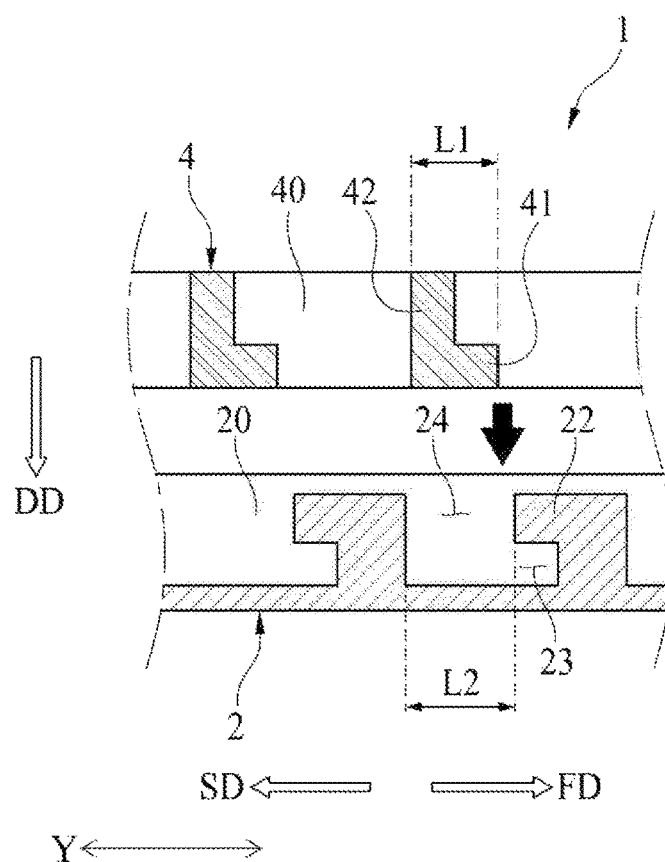
FIG. 7 is a side cross-sectional view schematically illustrating a state in which the plug assembly is separated from the receptacle assembly in the optical connector according to the present invention on the basis of line I-I shown in FIG. 3.

The insertion groove 24 is formed in the receptacle body 20 to communicate with the reception groove 21. The insertion groove 24 may be formed in the receptacle body 20 to be positioned in the second direction (the SD arrow direction) with respect to the protruding member 22. The insertion member 42 and the hook member 41 may be inserted into the insertion groove 24. The plug body 40 may be positioned inside the receptacle body 20 by being inserted into the reception groove 21 so that the insertion member 42 and the hook member 41 are inserted into the insertion groove 24. As shown in FIG. 7, the plug assembly 4 positioned above the receptacle assembly 2 may be moved in a downward direction (a DD arrow direction) to be inserted into the reception groove 21. In this process, as shown in FIG. 4, the insertion member 42 and the hook member 41 may be inserted into the insertion groove 24.

The insertion groove 24 may be formed to have a length L2 (see FIG. 7) greater than the sum L1 of lengths of the insertion member 42 and the hook member 41 on the basis of the first direction. Thus, the plug body 40 may be positioned at the second position P2 (see FIG. 5) by being moved in the first direction (the FD arrow direction) while the insertion member 42 and the hook member 41 are inserted into the insertion groove 24. Although the entire insertion groove 24 may be formed in a rectangular parallelepiped shape, the insertion groove 24 is not limited thereto and may be formed in another shape into which the insertion member 42 and the hook member 41 are insertable.

Since the length L2 of the insertion groove 24 is formed to be greater than the sum L1 of the lengths of the insertion member 42 and the hook member 41, the optical connector 1 according to the present invention may have the following effects.

First, the optical connector 1 according to the present invention may provide a moving path in the first direction (the FD arrow direction) after the plug body 40 is inserted into the reception groove 21 through the insertion groove 24. Accordingly, the optical connector 1 according to the present invention may have improved utilization for operations of inserting the plug body 40 into the reception groove 21 and connecting the plug body 40 to the photoelectric element array 3.

Second, in the optical connector 1 according to the present invention, as the insertion member 42 and the hook member 41 are inserted into the insertion groove 24 and are moved in the first direction (the FD arrow direction), the hook member 41 may be inserted into the hook groove 23. Thus, the plug body 40 is coupled to the receptacle body 20. Accordingly, the optical connector 1 according to the present invention can realize a function for providing a coupling force between the plug body 40 and the receptacle body 20 through the insertion groove 24. Thus, the optical connector 1 according to the present invention can have improved utilization for an operation of coupling the plug body 20 connected to the photoelectric element array 3 to the receptacle body 20.

The insertion groove 24 may be formed to communicate with the hook groove 23. The hook groove 23 may be positioned in the first direction (the FD arrow direction) with respect to the insertion groove 24. In this case, the hook member 41 may be formed to protrude from the insertion member 42 in the first direction (the FD arrow direction). Thus, when the plug body 40 positioned at the first position P1 is moved in the first direction (the FD arrow direction) and is positioned at the second position P2, the hook member 41 inserted into the insertion groove 24 may be moved in the first direction (the FD arrow direction) and may be inserted into the hook groove 23.

Here, the protruding member 22 may support the insertion member 42 of the plug body 40 positioned at the second position P2. Thus, the protruding member 22 may restrict a moving distance of the plug body 40 in the first direction (the FD arrow direction). Accordingly, an operator moves the plug body 40 positioned at the first position P1 in the first direction (the FD arrow direction) until the insertion member 42 is supported by the protruding member 22, and thus the plug body 40 may be positioned at the second position P2. Thus, since the optical connector 1 according to the present invention is implemented so that the plug body 40 is accurately and easily positioned at the second position P2, accuracy and utilization for optical arrangement between the plug assembly 4 and the photoelectric element array 3 can be further improved.

The plug assembly 4 may include a plurality of insertion members 42. The insertion members 42 may be formed to protrude toward both sides of the plug body 40 on the basis of the first axis direction (the X-axis direction). The insertion members 42 may be formed so that the insertion members 42 are positioned to be spaced apart from each other in the second axis direction (the Y-axis direction). For example, as shown in FIG. 6, two insertion members 42 may be formed so that the two insertion members 42 are positioned to be spaced apart from each other in the second axis direction (the Y-axis direction).

Figure 8:
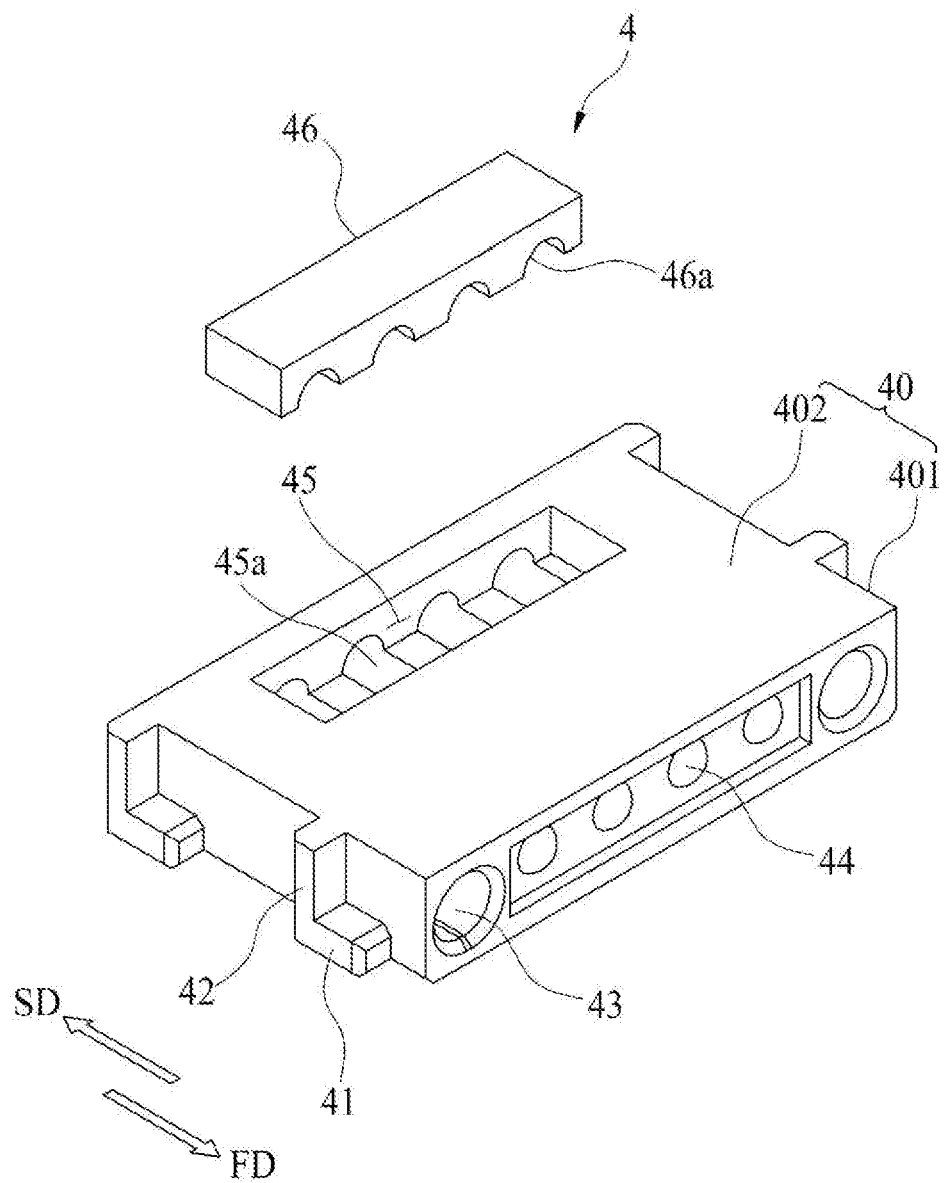
FIG. 8 is an exploded perspective view illustrating the plug assembly in the optical connector according to the present invention.

Referring to FIGS. 1 to 8, the plug assembly 4 may include a connection groove 43 (see FIG. 8).

The connection groove 43 is formed in the plug body 40 to be positioned in a direction from the plug body 40 toward the photoelectric element array 3. As the plug body 40 positioned at the first position P1 is moved in the first direction (the FD arrow direction), the connection member 31 of the photoelectric element array 3 is inserted into the connection groove 43. In this case, when the connection member 31 is inserted into the connection groove 43, the connection member 31 may guide movement of the plug body 40. Further, the connection member 31 inserted into the connection groove 43 may support the plug body 40. Accordingly, the optical connector 1 according to the present invention can have improved resistance to vibration, shaking, etc. As the plug body 40 positioned at the second position P2 is moved in the second direction (the SD arrow direction), the connection member 31 may be spaced apart from the connection groove 43. The plug assembly 4 may include a plurality of connection grooves 43. The connection grooves 43 may be formed to be spaced apart from each other in the first axis direction (the X-axis direction).

The plug assembly 4 may include a lens 44 (see FIG. 8), an open groove 45 (see FIG. 8), and a fixing part 46 (see FIG. 8).

The lens 44 is coupled to the plug body 40. The lens 44 may be coupled to the plug body 40 to be positioned in the direction from the plug body 40 toward the photoelectric element array 3. Thus, when the plug assembly 4 is connected to the photoelectric element array 3, the lens 44 is positioned between the optical transmission cable 10 (see FIG. 1) and the photoelectric element array 3, and thus the optical transmission cable 10 and the photoelectric element array 3 may be optically arranged. The plug assembly 4 may include a plurality of lenses 44. The plug assembly 4 may include the same number of lenses 44 as the number of optical transmission cables 10.

The open groove 45 may be formed by recessing an upper surface 402 of the plug body 40 to a predetermined depth.

Thus, the plug body 40 may be formed in a shape in which an upper side thereof is open. A lower support groove 46a (see FIG. 8) capable of surrounding a lower portion of the optical transmission cable 10 may be formed in a portion, in which the open groove 45 is formed, of the plug body 40.

The fixing part 46 is coupled to the plug body 40 by being inserted into the open groove 45. An upper support groove 47a (see FIG. 8) capable of surrounding an upper portion of the optical transmission cable 10 may be formed in the fixing part 46. The lower portion and the upper portion of the optical transmission cable 10 may be respectively inserted into the lower support groove 46a and the upper support groove 47a. Thus, since the fixing part 46 presses the optical transmission cable 10, the fixing part 46 may prevent shaking of the optical transmission cable 10. A material of the fixing part 46 is not particularly limited. For example, the fixing part 47 may have a refractive index similar to the optical transmission cable 10 and may be formed of a polymer-based epoxy having high light transmission. The fixing part 46 may have a refractive index of 1.2 to 1.8, and may be formed of a light transmitting epoxy having a light transmission rate of 80 to 95% within a wavelength band of the optical transmission cable 10.

Referring to FIGS. 1 to 10, the cover 5 is coupled to the receptacle assembly 2. Since the cover 5 is coupled to the receptacle body 20, the control element 20b or the like can be protected from an external environment.

The cover 5 may include a cover body 50 coupled to the receptacle body 20. The cover body 50 may be coupled to the receptacle body 20 so that the receptacle body 20 is accommodated therein. A passing hole 5a (see FIG. 9) may be formed in the cover body 50. The passing hole 5a is formed to pass through the cover body 50. The cover body 50 may be coupled to the receptacle body 20 so that the passing hole 5a communicates with the reception groove 21. Thus, the plug assembly 4 may pass through the cover body 50 via the passing hole 5a while the cover body 50 is coupled to the receptacle body 20, and may be inserted into the reception groove 21. The passing hole 5a may be formed to pass through an upper surface 501 of the cover body 50 (see FIG. 9) on the basis of FIG. 2.

Figure 10:
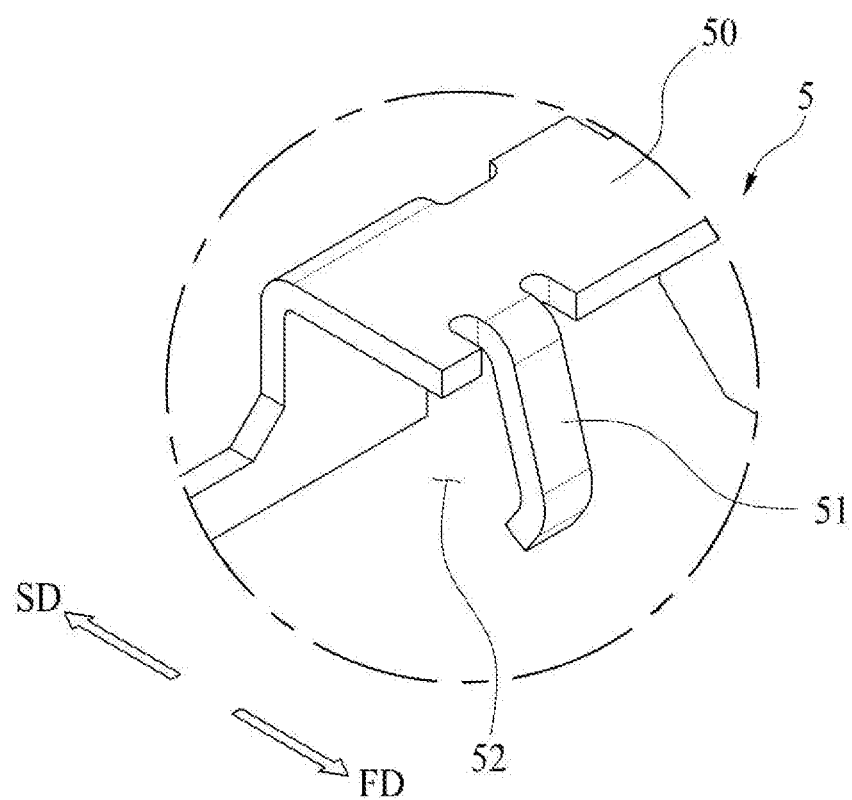
FIG. 10 is an enlarged view illustrating portion II, which is shown in FIG. 9, in the optical connector according to the present invention.

The cover 5 may include the support member 51 (see FIG. 10).

The support member 51 presses the plug assembly 4 inserted into the reception groove 21 in the first direction (the FD arrow direction). Thus, since the support member 51 presses and supports the plug assembly 4 positioned at the second position P2, an optical arrangement between the plug assembly 4 and the photoelectric element array 3 can be prevented from being dislocated by vibration, shaking, etc. Further, since the support member 51 presses the plug assembly 4 positioned at the first position P1 in the first direction (the FD arrow direction), utilization for an operation of moving the plug assembly 4 from the first position P1 to the second position P2 can be improved.

The support member 51 is formed on the cover body 50. The support member 51 may be formed on the cover body 50 to protrude toward the passing hole 5a (see FIG. 9). The support member 51 may be formed to protrude in the first direction (the FD arrow direction) from the cover body 50. When the plug assembly 4 is inserted into the reception groove 21, the support member 51 may be positioned in the second axis direction (the Y-axis direction) between the cover body 50 and the plug assembly 4.

The cover 5 may include a plurality of support members 51. The support members 51 may be disposed to be spaced apart from each other in the first axis direction (the X-axis direction). As shown in FIG. 3, the optical transmission cable 10 inserted into the plug assembly 4 may be positioned between the support members 51. Although the cover 5 includes two support members 51 in FIG. 3, the present invention is not limited thereto, and the cover 5 may include three or more support members 51. The support member 51 may be formed in a plate type to be elastically movable on the basis of a portion coupled to the cover body 50.

The cover 5 may include a pressing groove 52 (see FIG. 10).

The pressing groove 52 may be formed in the cover body 50. The support member 51 may be elastically moved through the pressing groove 52 in the first direction (the FD arrow direction) and the second direction (the SD arrow direction). As shown in FIG. 4, as the support member 51 presses the plug body 40 positioned at the first position P1, the support member 51 may be moved through the pressing groove 52 in the second direction (the SD arrow direction). Thus, the support member 51 may press the plug body 50 positioned at the first position P1 in the first direction (the FD arrow direction). Accordingly, as the support member 51 is moved through the pressing groove 52 in the second direction (the SD arrow direction), the optical connector 1 according to the present invention can increase a restoring force acting in the first direction (the FD arrow direction). Thus, the optical connector 1 according to the present invention can have more improved utilization for an operation of moving the plug body 40 from the first position P1 to the second position P2.

The pressing groove 52 may be formed in the cover body 50 to be positioned in the second direction (the FD arrow direction) with respect to the support member 51. When the cover 5 includes a plurality of support members 51, the cover 5 may include the same number of pressing grooves 52 as the number of support members 51.

Referring to FIGS. 1 to 11, the cover 5 may be coupled to the receptacle assembly 2 to be moveable in the first direction (the FD arrow direction) and the second direction (the SD arrow direction). In this case, the cover body 50 may be coupled to the receptacle body 20 to be moveable in the first direction (the FD arrow direction) and the second direction (the SD arrow direction).

Figure 11:
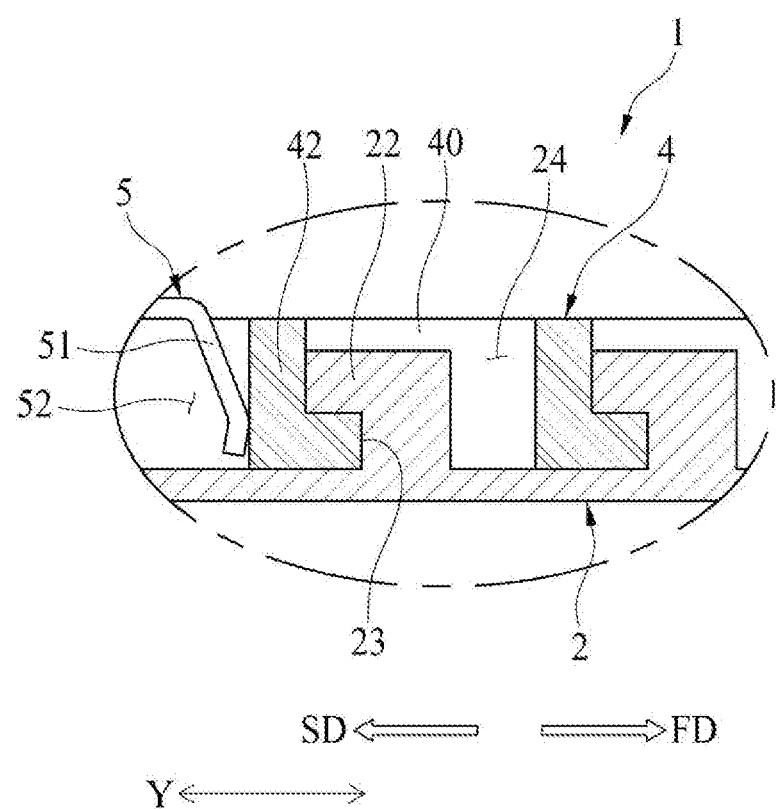
FIG. 11 is a side cross-sectional view schematically illustrating a state in which a support member presses and supports the plug assembly in the optical connector according to the present invention on the basis of line I-I shown in FIG. 3.

As shown in FIG. 5, when the plug body 40 is positioned at the second position P2, the cover body 50 may be moved in the first direction (the FD arrow direction). Thus, as shown in FIG. 11, as the support member 51 presses the plug body 40 positioned at the second position P2, the support member 51 is moved through the pressing groove 52 in the second direction (the SD arrow direction). Accordingly, since the optical connector 1 according to the present invention may increase a pressing force of the support member 51 which presses the plug body 40 positioned the second position P2, the optical connector 1 may be implemented so that a state in which the plug assembly 4 is connected to the photoelectric element array 3 is firmly maintained.

Figure 9:
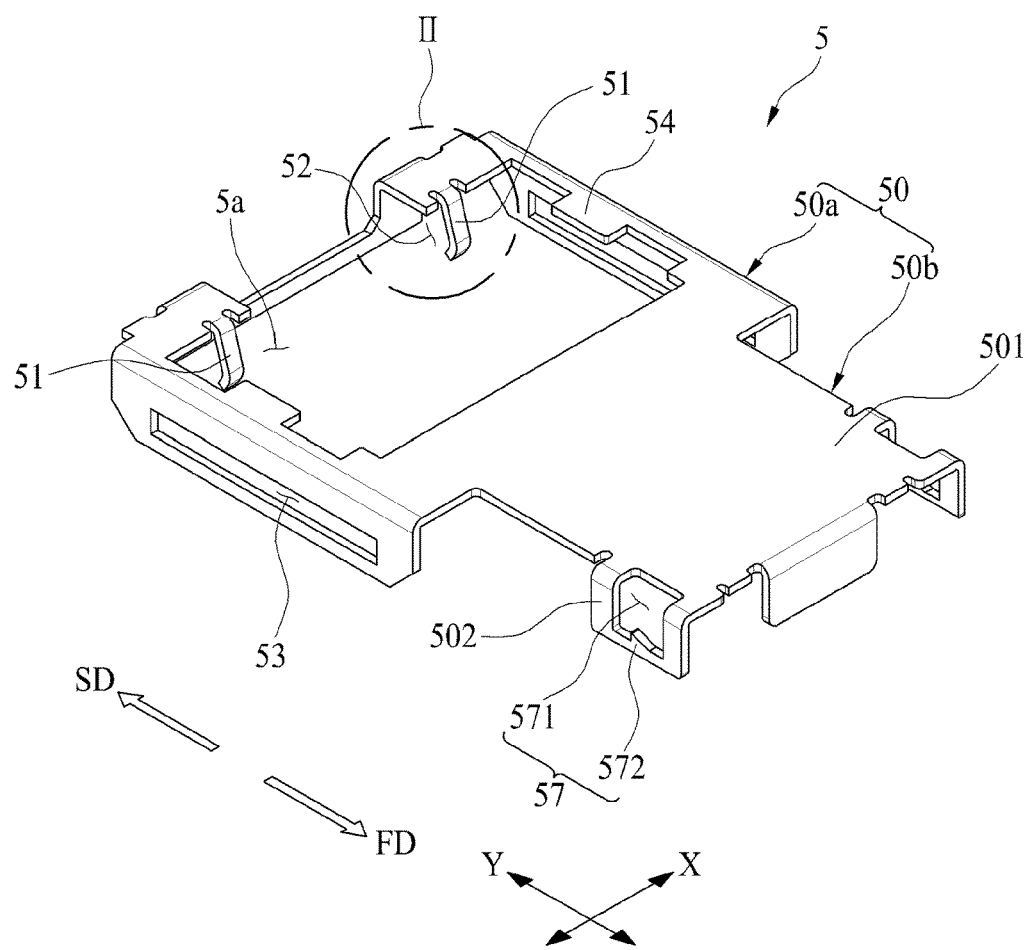
FIG. 9 is a perspective view illustrating a cover in the optical connector according to the present invention.

Referring to FIGS. 1 to 11, the cover 5 may include a guide groove 53 (see FIG. 9).

The guide groove 53 is formed to pass through the cover body 50. The guide groove 53 may be formed to pass through a side wall 502 of the cover body 50 (see FIG. 9). Although the guide groove 53 may be formed in a rectangular parallelepiped shape including a rectangular shape having a long length in the second axis direction (the Y-axis direction), the guide groove 53 is not limited thereto and may be formed in another shape. The cover 5 may include a plurality of guide grooves 53. In this case, the guide grooves 53 may be formed in both sides of the cover body 50 on the basis of the first axis direction (the X-axis direction). The guide grooves 53 in each of both of the sides of the cover body 50 may be formed so that the guide grooves 53 are positioned to be spaced apart from each other in the second axis direction (the Y-axis direction).

When the cover 5 includes the guide groove 53, the receptacle assembly 2 may include a guide member 25. The guide member 25 is formed to protrude from the receptacle body 20. The cover body 50 may be coupled to the receptacle body 20 so that the guide member 25 is inserted into the guide groove 53. Thus, the cover body 50 may be guided by the guide member 25 inserted into the guide groove 53 and may be moved in the first direction (the FD arrow direction) and the second direction (the SD arrow direction). Accordingly, the optical connector 1 according to the present invention can have improved utilization and accuracy for an operation of moving the cover body 50.

The guide member 25 may be formed to protrude outward from the outer side wall 203 of the receptacle body 20. The guide member 25 may be formed to protrude in the first axis direction (the X-axis direction). The guide member 25 may be formed to have a shape corresponding to the guide groove 53. The guide member 25 may be formed to have a smaller length than a length of the guide groove 53 on the basis of the second axis direction (the Y-axis direction) so that the guide member 25 inserted into the guide groove 53 may be moved.

When the cover 5 includes a plurality of guide grooves 53, the receptacle assembly 2 may include a plurality of guide members 25. The guide members 25 may be formed in the first axis direction (the X-axis direction) on both sides of the receptacle body 20. The guide members 25 on each of both of the sides of the receptacle body 20 may be formed so that the guide members 25 are positioned to be spaced apart from each other in the second axis direction (the Y-axis direction).

Figure 12:
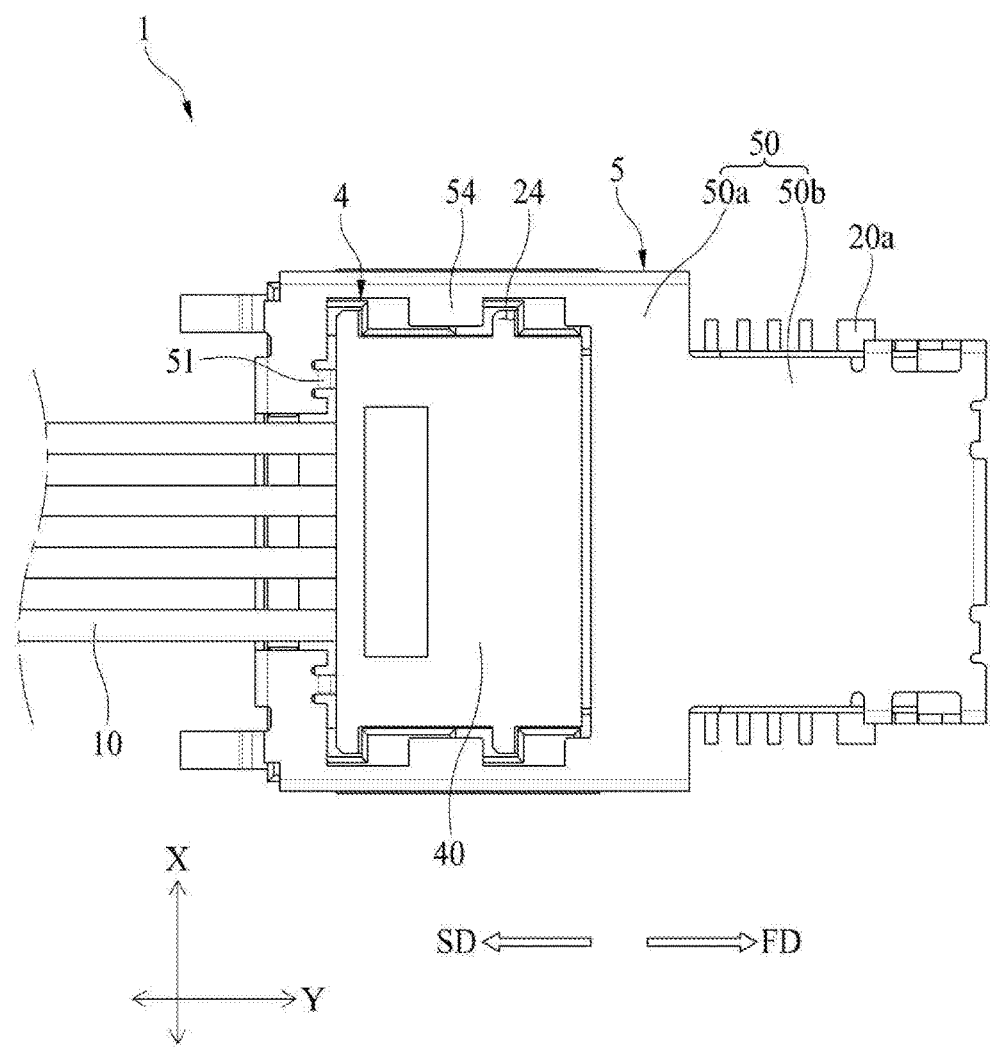
FIG. 12 is a plan view illustrating a state in which an insertion groove is closed by an opening and closing member in the optical connector according to the present invention.

Referring to FIGS. 1 to 12, the cover 5 may include an opening and closing member 54 (see FIG. 12).

The opening and closing member 54 is formed on the cover body 50 to protrude toward the passing hole 5a (see FIG. 9). The opening and closing member 54 may be formed on the cover body 50 to protrude in the first axis direction (the X-axis direction). As the cover body 50 is moved, the opening and closing member 54 may be moved between a closed position and an open position.

As shown in FIG. 3, when the opening and closing member 54 is positioned at the open position, the opening and closing member 54 may be spaced apart from the insertion groove 24. Thus, the insertion groove 24 is not blocked by the opening and closing member 54 and is in an open state. In this state, the plug assembly 4 may be inserted into the reception groove 21 without interference from the opening and closing member 54. As the cover body 50 is moved in the second direction (the SD arrow direction), the opening and closing member 54 may be positioned at the open position.

As shown in FIG. 12, when the opening and closing member 54 is positioned at the closed position, the opening and closing member 54 may block the insertion groove 24. As the opening and closing member 54 is positioned to overlap the insertion groove 24, the opening and closing member 54 may block the insertion groove 24. The opening and closing member 54 may block a part or all of the insertion groove 24. Thus, the insertion groove 24 is blocked by the opening and closing member 54 and is in a closed state. Accordingly, the optical connector 1 according to the present invention may provide a user with information on a position of the opening and closing body 50 using a position of the opening and closing member 54 and may reduce an open area of the insertion groove 24, and thus resistance to vibration, shaking, or the like can be improved. As the cover body 50 is moved in the first direction (the FD arrow direction), the opening and closing member 54 may be positioned at the closed position. Although the opening and closing member 54 blocks a part of the insertion groove 24 in FIG. 12, the present invention is not limited thereto, and the opening and closing member 54 may be implemented to totally block the insertion groove 24.

Although the entire opening and closing member 54 may be formed in a tetragonal plate type, the opening and closing member 54 is not limited thereto and may be formed in another shape which is a shape capable of opening and closing the insertion groove 24. The opening and closing member 54 may be formed to protrude in the first axis direction (the X-axis direction) by a length that does not block the reception groove 21. The cover 5 may include a plurality of opening and closing members 54. In this case, the opening and closing members 54 are formed so that the opening and closing members 54 are positioned to be spaced apart from each other in the first axis direction (the X-axis direction).

Figure 13:
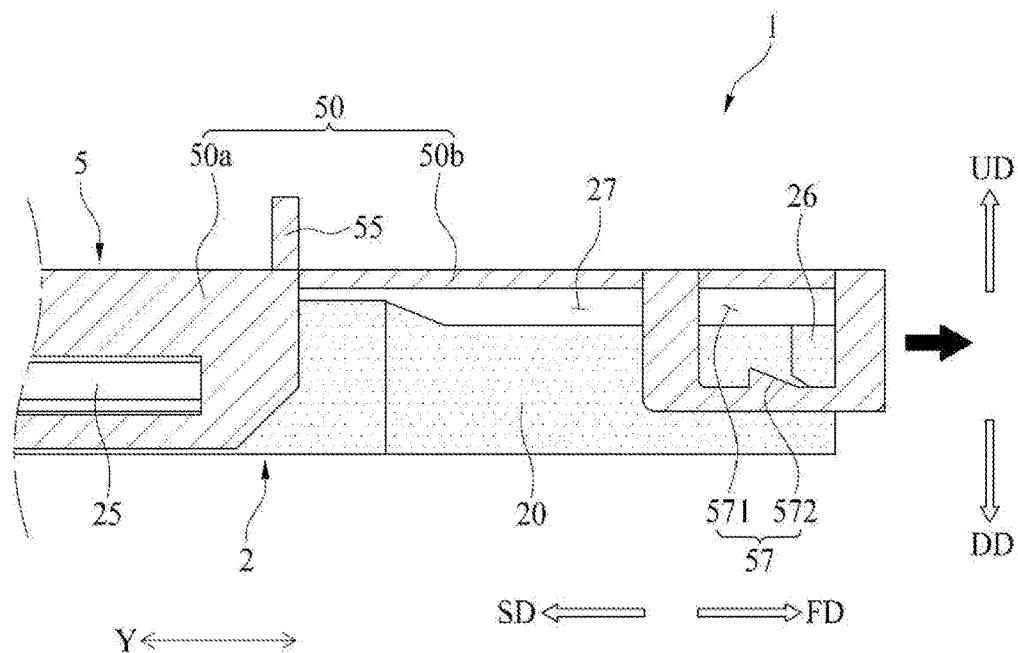
FIGS. 13 to 15 are side views for describing an operation of a fixing member in an optical connector according to a first embodiment of the present embodiment.

Referring to FIG. 13, the opening and closing part 5 may include a grip lever 55 (see FIG. 13).

The grip lever 55 is for moving the cover body 50 in the first direction (the FD arrow direction) and the second direction (the SD arrow direction). The grip lever 55 may be formed to protrude from the cover body 50. For example, the grip lever 55 may be formed to protrude from the upper surface 501 of the cover body 50. An operator may grip the grip lever 55 and move the cover body 50. Accordingly, the optical connector 1 according to the present invention may have improved utilization for an operation of moving the cover body 50 in the first direction (the FD arrow direction) and the second direction (the SD arrow direction).

Although the entire grip lever 55 may be formed in a tetragonal plate type, the grip lever 55 is not limited thereto and may be formed in another shape which is a shape capable of being griped by an operator. The grip lever 55 may be formed by cutting a part of the upper surface 501 of the cover body 50 and performing a bending process of the cut portion.

Referring to FIGS. 11 and 13, the cover 5 may include a fixing member 57.

The fixing member 57 is for fixing the cover body 50. The fixing member 57 may fix the cover body 50 moved in the first direction (the FD arrow direction). Thus, the fixing member 57 may maintain a state in which a pressing force of the support member 51 (see FIG. 11) which presses the plug assembly 4 is increased. This will be described in detail below.

First, when the plug body 40 is positioned at the second position P2, the cover body 50 is moved in the first direction (the FD arrow direction). Thus, as shown in FIG. 11, as the support member 51 presses the plug body 40 positioned at the second position P2, the support member 51 is moved in the second direction (the SD arrow direction) through the pressing groove 52. Thus, a pressing force of the support member 51 which presses the plug assembly 4 in the first direction (the FD arrow direction) is increased.

Then, when the cover body 50 is moved in the first direction (the FD arrow direction), the fixing member 57 is supported by the receptacle body 20. Thus, the fixing member 57 may fix the cover body 50 to maintain the state in which a pressing force of the support member 51 which presses the plug assembly 4 is increased.

Accordingly, the optical connector 1 according to the present invention can be implemented so that the state in which the plug assembly 4 connected to the photoelectric element array 3 is firmly maintained, and furthermore, can further improve resistance to vibration, shaking, or the like.

Here, the optical connector 1 according to the present invention may roughly include a first embodiment and a second embodiment according to the fixing member 57. Hereinafter, the first embodiment and the second embodiment will be described in detail with reference to the accompanying drawings.

Referring to FIGS. 13 to 16, in the optical connector 1 according to the first embodiment of the present embodiment, the fixing member 57 may include a through hole 571 and a support protrusion 572. The hatching shown in FIGS. 13 to 16 is not a cross-sectional view but is displayed for distinguishing spaces such as a groove, a hole, or the like.

The through hole 571 is formed to pass through the cover body 50. The through hole 571 may be formed to pass through the side wall 502 of the cover body 50 (see FIG. 9). The through hole 571 may be positioned in the first direction (the FD arrow direction) with respect to the guide groove 53 (see FIG. 14).

The support protrusion 572 is formed on the cover body 50 to protrude toward the through hole 571. The support protrusion 572 may be formed on the cover body 50 to protrude in an upward direction (a UD arrow direction) in the through hole 571. The upward direction (the UD arrow direction) is a direction opposite the downward direction (the DD arrow direction). As the support protrusion 572 is formed, the through hole 571 may include a first insertion groove 571a (see FIG. 14) positioned in the first direction (the FD arrow direction) with respect to the support protrusion 572 and a second insertion groove 571b (see FIG. 14) positioned in the second direction (the SD arrow direction) with respect to the support protrusion 572. That is, the support protrusion 572 is formed to protrude between the first insertion groove 571a and the second insertion groove 571b. The support protrusion 572 may be formed on the side wall 502 of the cover body 50.

Here, the receptacle assembly 2 may include an insertion protrusion 26 formed to protrude from the receptacle body 20. The insertion protrusion 26 may be inserted into the through hole 571. The cover body 50 may be coupled to the receptacle body 20 so that the insertion protrusion 26 is inserted into the through hole 571. The insertion protrusion 26 may be formed to protrude outward from the outer side wall 203 of the receptacle body 20 (see FIG. 2). Although the entire insertion protrusion 26 may be formed in a rectangular parallelepiped shape, the insertion protrusion 26 is not limited thereto and may be formed in another shape which is a shape capable of being inserted into the through hole 571 to be movable.

In the optical connector 1 according to the first embodiment of the present embodiment, an operation of fixing the cover body 50 using the fixing member 57 will be described below.

First, as shown in FIG. 13, the insertion protrusion 26 is inserted into the first insertion groove 571a. In this case, the cover body 50 is moved in the second direction (the SD arrow direction).

Figure 14:
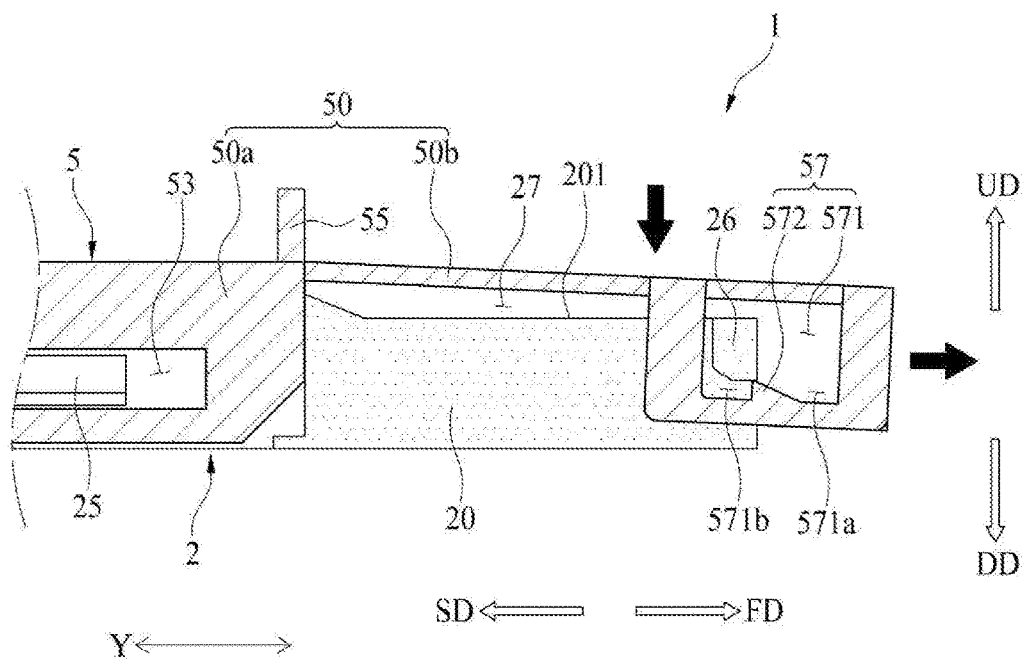

Then, as shown in FIG. 14, when the cover body 50 is moved in the first direction (the FD arrow direction), the support protrusion 572 is moved to the insertion protrusion 26 and presses the insertion protrusion 26. In this case, as the insertion protrusion 26 presses the portion, a portion of the cover body 50 on which the support protrusion 572 is formed is moved in the downward direction (the DD arrow direction).

Figure 15:
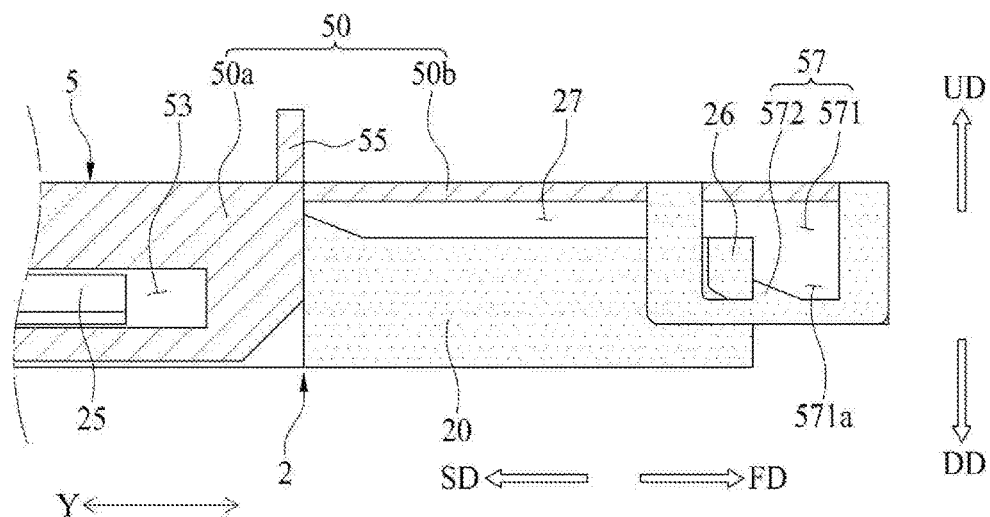
Figure 16:
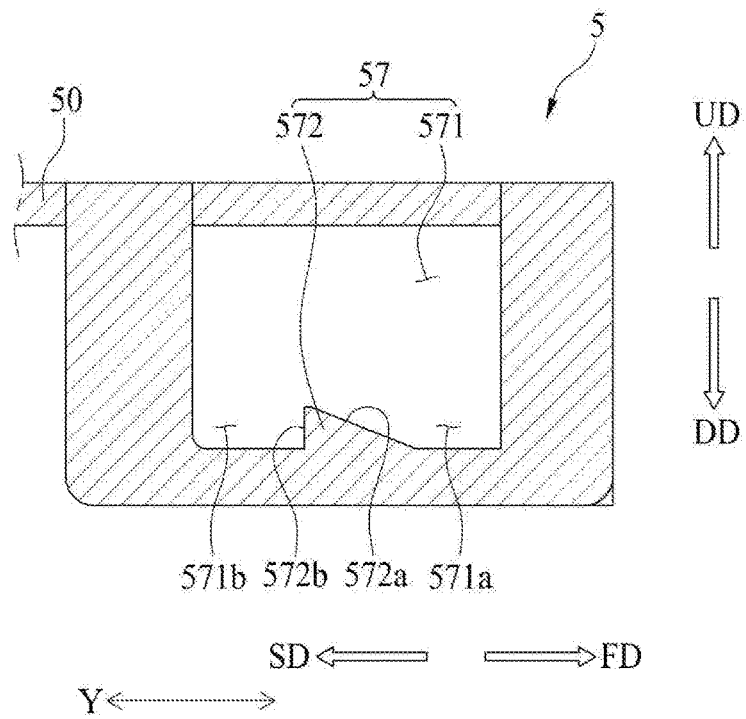
FIG. 16 is an enlarged side view illustrating the fixing member in the optical connector according to the first embodiment of the present embodiment.

Then, as shown in FIG. 15, when the cover body 50 is additionally moved in the first direction (the FD arrow direction), the support protrusion 572 passes the insertion protrusion 26 and a pressing force of the insertion protrusion 26 is released. The insertion protrusion 26 passes the support protrusion 572 and is inserted into the second insertion groove 571b (see FIG. 14). In this case, a portion of the cover body 50 on which the support protrusion 572 is formed is moved in the upward direction (the UD arrow direction) as the pressing force of the insertion protrusion 26 is released.

When the insertion protrusion 26 is inserted into the second insertion groove 571b, the support protrusion 572 may be supported by the support protrusion 572 inserted into the insertion protrusion 26 and may fix the cover body 50. In this case, as shown in FIG. 11, the support member 51 is pressed by the plug body 40 positioned at the second position P2 and is moved through the pressing groove 52 in the second direction (the SD arrow direction), and thus the support member 51 is in a state in which a pressing force which presses the plug body 40 positioned at the second position P2 is increased. Accordingly, since the fixing member 57 may fix the cover body 50 while a pressing force of the support member 51 which presses the plug body 40 positioned at the second position P2 is increased, the plug assembly 4 connected to the photoelectric element array 3 may be implemented to be firmly maintained.

The support protrusion 572 may include an inclined surface 572a (see FIG. 16) disposed in the first direction (the FD arrow direction). The inclined surface 572a is obliquely formed so that the support protrusion 572 further protrudes toward the through hole 571 in the second direction (the SD arrow direction). That is, the inclined surface 572a inclined in the second direction (the SD arrow direction) is formed to be upwardly inclined in the upward direction (the UD arrow direction). Thus, when the cover body 50 is moved in the first direction (the FD arrow direction), the insertion protrusion 26 inserted into the first insertion groove 571a may smoothly pass the support protrusion 572 through the inclined surface 572a and may be inserted into the second insertion groove 571b. Accordingly, the optical connector 1 according to the first embodiment of the present embodiment may have improved utilization for the operation of moving the cover body 50 in the first direction (the FD arrow direction).

The support protrusion 572 may include a support surface 572b disposed in the second direction (the SD arrow direction). The support surface 572b is formed as a flat surface parallel to the insertion protrusion 26. Thus, when movement of the cover body 50 in the first direction (the FD arrow direction) is completed, because the support surface 572b firmly supports the insertion protrusion 26, the cover body 50 may be fixed. Accordingly, the optical connector 1 according to the first embodiment of the present embodiment can improve resistance to vibration, shaking, etc.

Here, the cover body 50 may include a first cover body 50a (see FIG. 14) and a second cover body 50b (see FIG. 14).

The passing hole 5a (see FIG. 9) is formed in the first cover body 50a. The first cover body 50a may be disposed so that the passing hole 5a communicates with the reception groove 21 (see FIG. 6).

The through hole 571 and the support protrusion 572 are formed in and on the second cover body 50b. The second cover body 50b may be elastically moved in the through hole 571 with respect to the first cover body 50a according to a position of the insertion protrusion 26. For example, as the support protrusion 572 is pressed by the insertion protrusion 26, the second cover body 50b may be moved in the downward direction (the DD arrow direction) with respect to the first cover body 50a. As the insertion protrusion 26 is inserted into the first insertion groove 571a or the second insertion groove 571b, the second cover body 50b may be moved in the upward direction (the UD arrow direction) with respect to the first cover body 50a. Accordingly, the optical connector 1 according to the first embodiment of the present embodiment can have improved utilization for the operation of moving the cover body 50 in the first direction (the FD arrow direction). Further, since the optical connector 1 according to the first embodiment of the present embodiment may increase a protruding length of the support protrusion 572 in the upward direction (the UD arrow direction), a fixing force for fixing the cover body 50 moved in the first direction (the FD arrow direction) can be increased.

In this case, a movement groove 27 (see FIG. 14) for elastically moving the second cover body 50b may be formed in the receptacle body 20. The movement groove 27 may be formed by recessing the upper surface 201 of the receptacle body 20 to a predetermined depth. Thus, since the optical connector 1 according to the first embodiment of the present embodiment can increase an elastic movement distance of the second cover body 50b with respect to the first cover body 50a, the protruding length of the support protrusion 572 in the upward direction (the UD arrow direction) can be further increased. Accordingly, the optical connector 1 according to the first embodiment of the present embodiment can have more improved utilization for the operation moving the cover body 50 in the first direction (the FD arrow direction), and furthermore, can further increase the fixing force for fixing the cover body 50 moved in the first direction (the FD arrow direction).

Figure 17:
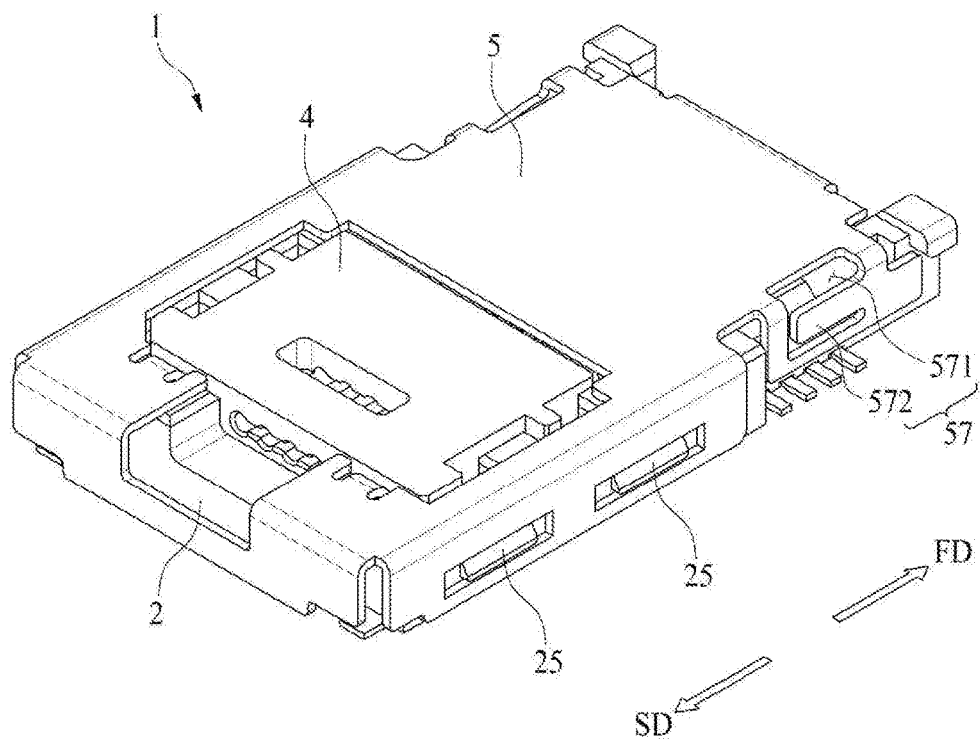
FIG. 17 is a coupled perspective view illustrating an optical connector according to a second embodiment of the present embodiment.
Figure 18:
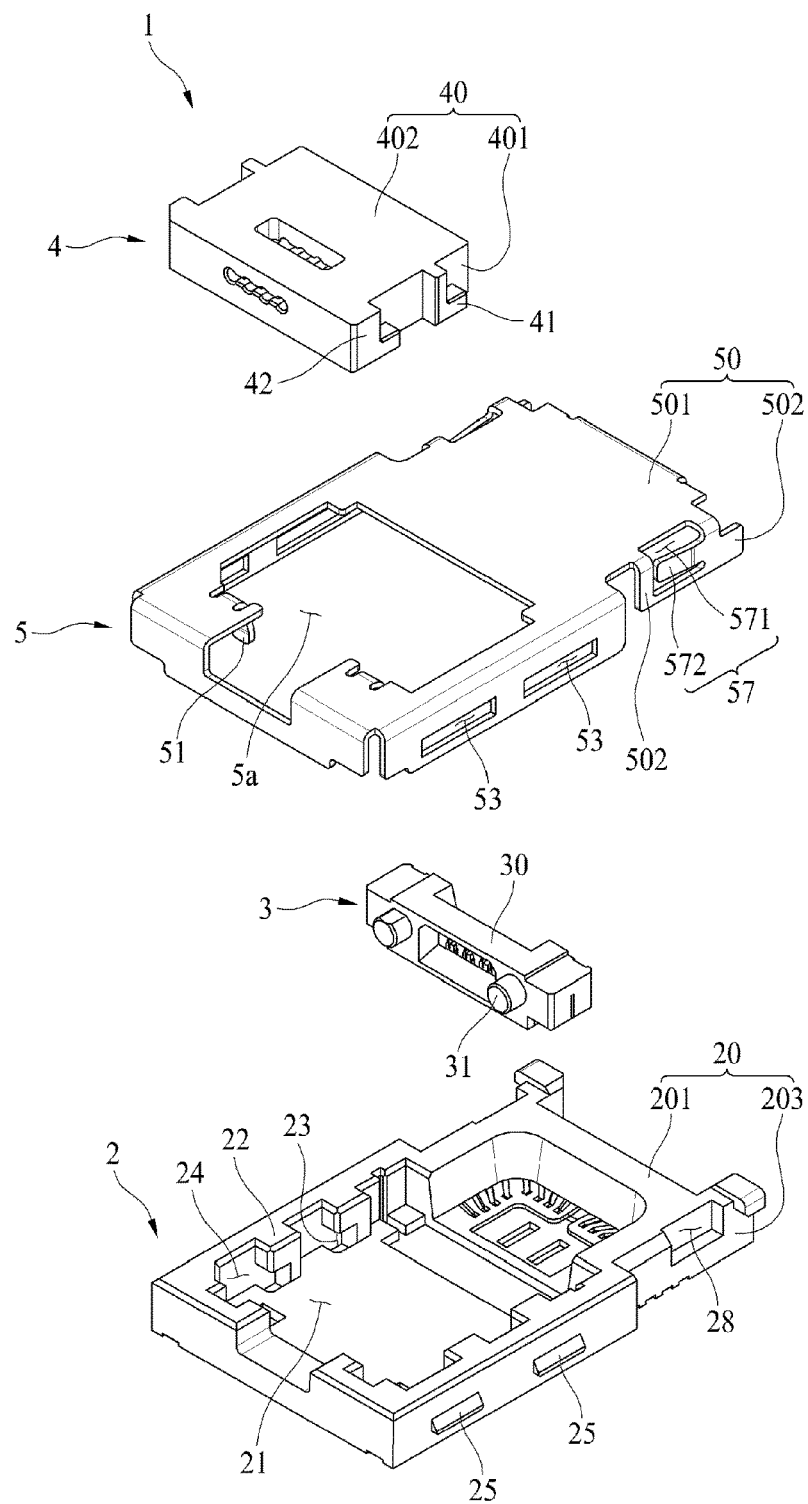
FIG. 18 is an exploded perspective view illustrating the optical connector according to the second embodiment of the present embodiment.
Figure 19:
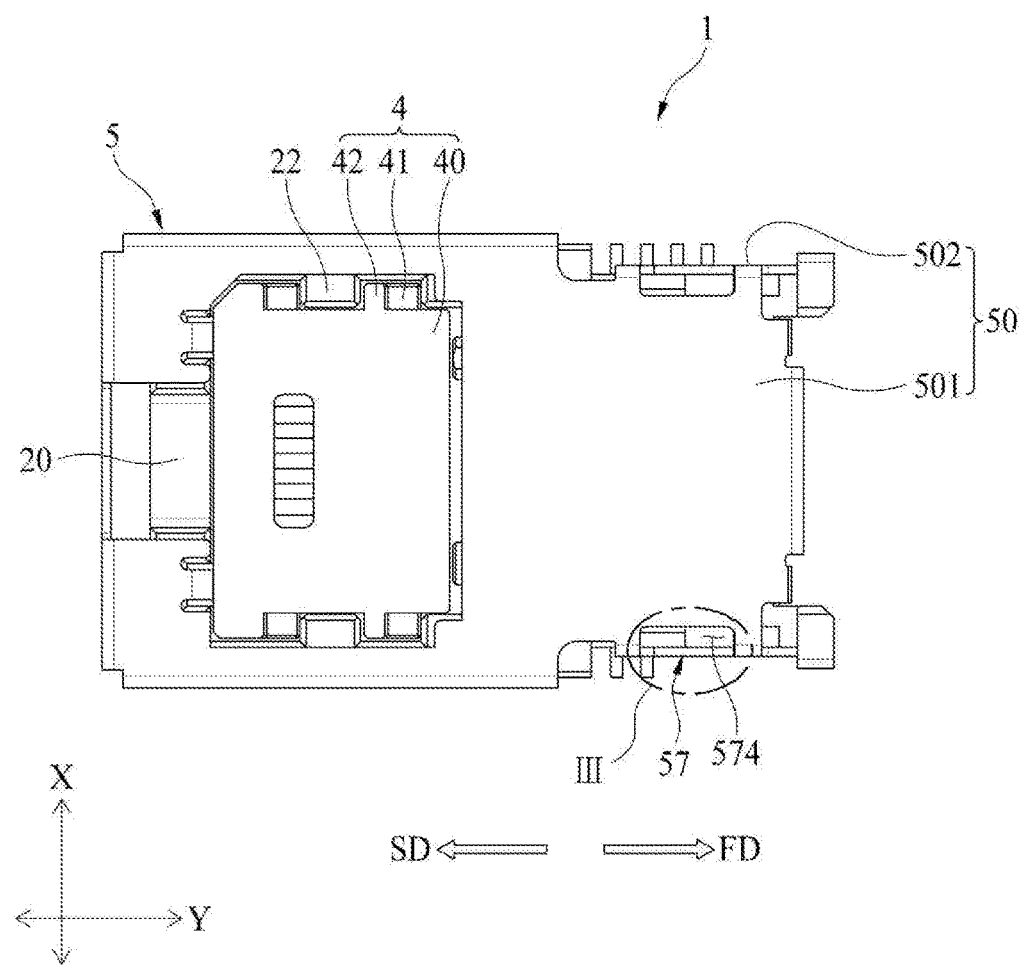
FIG. 19 is a plan view illustrating the optical connector according to the second embodiment of the present embodiment.
Figure 20:
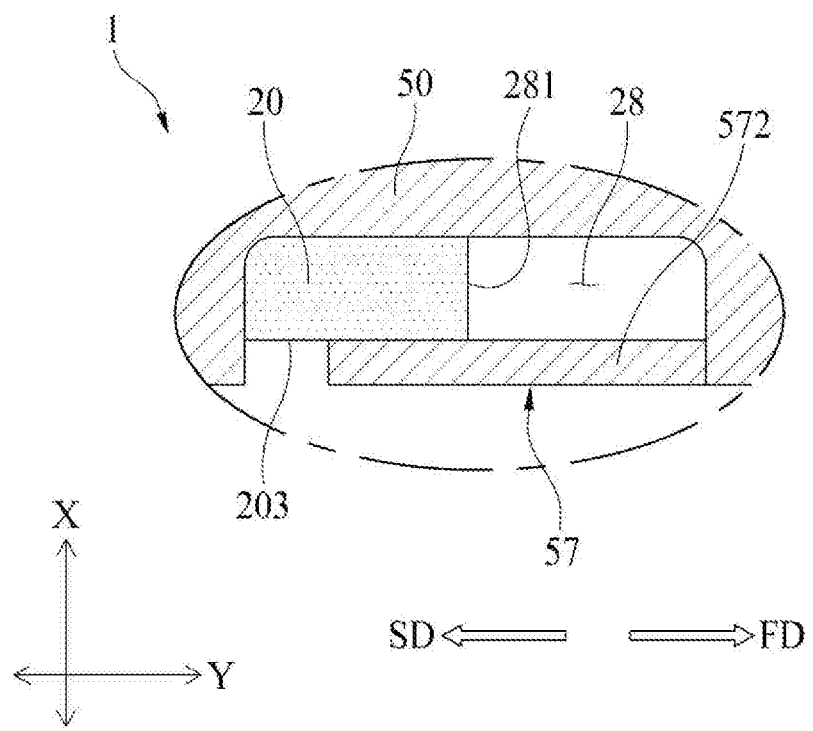
FIGS. 20 and 21 are enlarged plan view illustrating portion III shown in FIG. 19 for describing an operation of a fixing member in the optical connector according to the second embodiment of the present embodiment.
Figure 21:
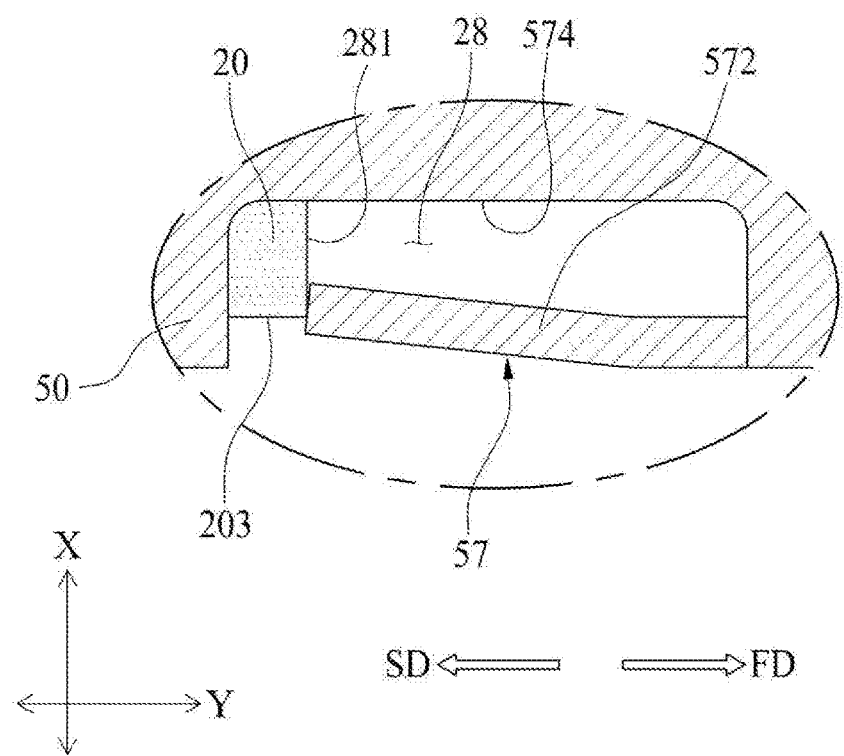
Figure 22:
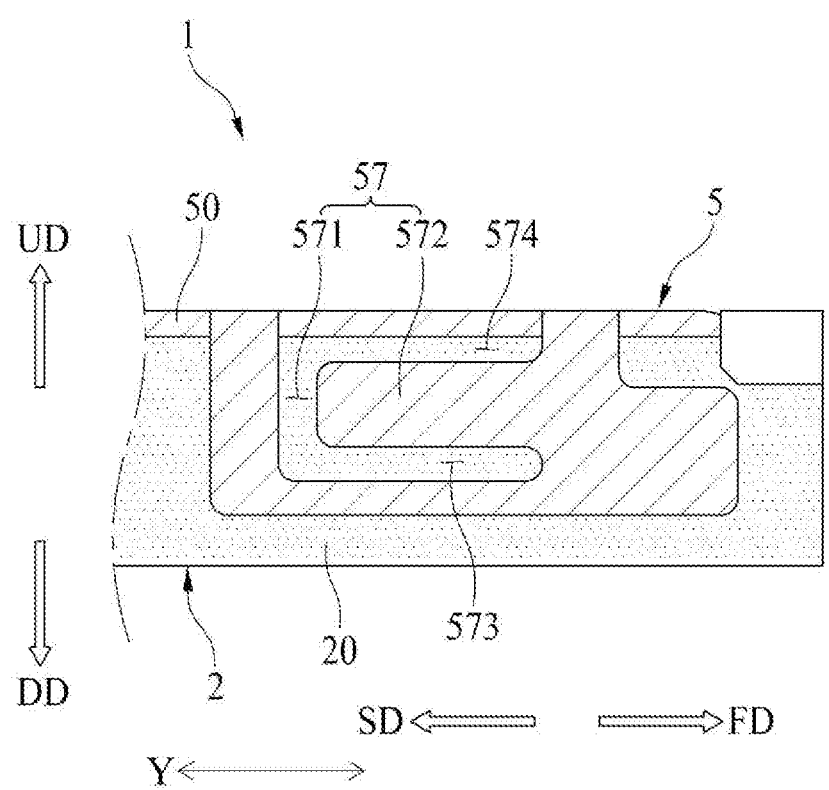
FIG. 22 is an enlarged side view illustrating the fixing member in the optical connector according to the second embodiment of the present embodiment.

Referring to FIGS. 17 to 22, in the optical connector 1 according to the second embodiment of the present embodiment, the fixing member 57 may include the through hole 571 and the support protrusion 572. The hatching shown in FIGS. 20 to 22 is not a cross-sectional view but is displayed for distinguishing spaces such as a groove, a hole, or the like. Meanwhile, as shown in FIGS. 17 and 18, in the optical connector 1 according to the second embodiment of the present embodiment, although the receptacle assembly 2, the photoelectric element array 3, the plug assembly 4, and the cover 5 except for the fixing member 57 are slightly different from the optical connector 1 according to the present invention in terms of shapes thereof, they are implemented to have substantially the same functions as those of the optical connector 1 according to the present invention, and thus detailed descriptions thereof will be omitted.

The through hole 571 is formed to pass through the cover body 50. The through hole 571 may be formed to pass through the side wall 502 of the cover body 50 (see FIG. 18). The through hole 571 may be positioned in the first direction (the FD arrow direction) with respect to the guide groove 53 (see FIG. 14).

The support protrusion 572 is formed on the cover body 50 to protrude toward the through hole 571 (see FIG. 18). The support protrusion 572 may be formed on the cover body 50 to protrude in the second direction (the SD arrow direction) in the through hole 571. The support protrusion 572 may be formed on the side wall 502 of the cover body 50. Although the entire support protrusion 572 may be formed in a tetragonal plate type, the support protrusion 572 is not limited thereto and may be formed in another shape.

Here, the receptacle assembly 2 may include a support groove 28 (see FIG. 18) and a hook surface 281 (see FIG. 20).

The support groove 28 is formed in the receptacle body 20. The support groove 28 may be formed by recessing the outer side wall 203 of the receptacle body 20 (see FIG. 18) to a predetermined depth. The support groove 28 may also be formed by recessing each of the outer side wall 203 of the receptacle body 20 and the upper surface 201 of the receptacle body 20 (see FIG. 18) to a predetermined depth. As the cover body 50 is moved in the first direction (the FD arrow direction), the support protrusion 572 may be inserted into the support groove 28. Although the entire support groove 28 may be formed in a rectangular parallelepiped shape, the support groove 28 is not limited thereto and may be formed in another shape into which the support protrusion 572 is insertable according to movement of the cover body 50.

The hook surface 281 is formed on the receptacle body 20. The hook surface 281 is a surface of the receptacle body 20 disposed in the first direction (the FD arrow direction) in the support groove 28. The hook surface 281 may support the support protrusion 572 inserted into the support groove 28. Because the support protrusion 572 inserted into the support groove 28 is supported by the hook surface 281, the cover body 50 may be fixed.

In the optical connector 1 according to the second embodiment of the present embodiment, an operation of fixing the cover body 50 using the fixing member 57 will be described below.

First, as shown in FIG. 20, the support protrusion 572 is supported by the outer side wall 203 of the receptacle body 20. In this case, the cover body 50 is moved in the second direction (the SD arrow direction).

Then, as shown in FIG. 21, when the cover body 50 is moved in the first direction (the FD arrow direction), the support protrusion 572 passes the outer side wall 203 and is inserted into the support groove 28. In this case, the support protrusion 572 is moved toward the support groove 28.

When the support protrusion 572 is inserted into the support groove 28, the support protrusion 572 may be supported by the hook surface 281, and thus the cover body 50 may be fixed. In this case, as shown in FIG. 11, the support member 51 is pressed by the plug body 40 positioned at the second position P2 and is moved through the pressing groove 52 in the second direction (the SD arrow direction), and thus the support member 51 is in a state in which a pressing force which presses the plug body 40 positioned at the second position P2 is increased. Accordingly, since the fixing member 57 may fix the cover body 50 while the pressing force of the support member 51 which presses the plug body 40 positioned at the second position P2 is increased, the plug assembly 4 connected to the photoelectric element array 3 may be implemented to be firmly maintained.

Referring to FIG. 22, the fixing member 57 may include an elastic groove 573. The elastic groove 573 is formed to pass through the cover body 50. The elastic groove 573 may be formed to pass through the side wall 502 of the cover body 50 (see FIG. 18) to be positioned in the downward direction (the UD arrow direction) with respect to the support protrusion 572. Thus, since the support protrusion 572 may increase an elastic movement distance through the elastic groove 573 with respect to the cover body 50, a fixing force for fixing the cover body 50 moved in the first direction (the FD arrow direction) can be increased. The elastic groove 573 may be formed to have a depth corresponding to a length of the support protrusion 572 on the basis of the second axis direction (the Y-axis direction).

Referring to FIGS. 19 and 21, the fixing member 57 may include a release groove 574 for separating the support protrusion 572 inserted into the support groove 28 from the support groove 28. The release groove 574 may be formed to pass through the upper surface 501 of the cover body 50 (see FIG. 19). Thus, the release groove 574 may serve as a path through which a pressing part (not shown) may be inserted into the cover body 50. In this case, the support protrusion 572 inserted into the support groove 28 is pushed by the pressing part inserted through the release groove 574 and may be moved to be spaced apart from the support groove 28. Accordingly, the optical connector 1 according to the second embodiment of the present embodiment can firmly fix the cover body 50 moved in the first direction (the FD arrow direction), and furthermore, can have improved utilization for an operation of releasing a fixing force applied on the cover body 50 through the release groove 574.

The present invention described above is not limited to the above-described embodiments and the accompanying drawings, and it should be apparent to those skilled in the art that various changes, substitutions, and modifications may be made therein without departing from the spirit of the invention.

The invention claimed is:

1. An optical connector comprising:
    a receptacle assembly to be coupled to a substrate;
    a cover coupled to the receptacle assembly;
    a photoelectric element array coupled to the receptacle assembly; and
    a plug assembly inserted into a reception groove formed in the receptacle assembly and movably coupled to the receptacle assembly, wherein:
    the plug assembly includes a plug body inserted into the reception groove to be movable between a first position spaced apart from the photoelectric element array and a second position connected to the photoelectric element array, and a hook member formed to protrude from the plug body,
    the cover includes a support member which presses the plug assembly in a first direction from the first position toward the second position and supports the plug assembly connected to the photoelectric element array,
    the receptacle assembly includes a receptacle body in which the reception groove is formed, a protruding member formed on the receptacle body to protrude toward the reception groove, and a hook groove formed in the protruding member,
    the hook member is inserted into the hook groove as the plug assembly is moved to the second position, and
    the protruding member supports the hook member inserted into the hook groove,
    the cover includes a cover body coupled to the receptacle assembly to be movable in the first direction and a second direction opposite the first direction, and a fixing member configured to fix the cover body, and
    the fixing member includes a through hole formed to pass through the cover body and a support protrusion formed on the cover body to protrude toward the through hole,
    the receptacle assembly includes an insertion protrusion formed to protrude from the receptacle body and inserted into the through hole, the through hole includes a first insertion groove positioned in the first direction with respect to the support protrusion and a second insertion groove positioned in the second direction with respect to the support protrusion, the insertion protrusion inserted into the first insertion groove passes the support protrusion and is inserted into the second insertion groove as the cover body is moved in the first direction, and the support protrusion is supported by the insertion protrusion positioned in the second insertion groove and fixes the cover body.

2. The optical connector of claim 1, wherein:

the receptacle assembly includes an insertion groove formed in the receptacle body;

the plug assembly includes an insertion member formed to protrude from the plug body; and the plug body is inserted into the reception groove so that the insertion member and the hook member are inserted into the insertion groove.

3. The optical connector of claim 2, wherein:

the plug body is moved in the first direction while the insertion member is inserted into the insertion groove and is positioned at the second position; and the protruding member supports the insertion member of the plug body positioned at the second position so that a moving distance of the plug body in the first direction is restricted.

4. The optical connector of claim 2, wherein the insertion groove is formed to have a length greater than the sum of lengths of the insertion member and the hook member on the basis of the first direction.

5. The optical connector of claim 2, wherein:

the hook member is formed to protrude from the insertion member in the first direction; and the hook groove is positioned in the first direction with respect to the insertion groove and is formed to communicate with the insertion groove.

6. The optical connector of claim 1, wherein:

the cover includes a guide groove formed to pass through the cover body, the receptacle assembly includes a guide member formed to protrude from the receptacle body, and the cover body is guided by the guide member inserted into the guide groove and is moved in the first direction and the second direction.

7. The optical connector of claim 1, wherein:

the fixing member fixes the cover body moved in the first direction to increase a pressing force of the support member which presses the plug assembly as the cover body is moved in the first direction.

8. The optical connector of claim 1, wherein:

the support protrusion includes an inclined surface disposed in the first direction, and the inclined surface is obliquely formed so that the support protrusion further protrudes toward the through hole in the second direction.

9. The optical connector of claim 1, wherein:

the support protrusion includes a support surface disposed in the second direction; and the support surface is formed to have a flat surface parallel to the insertion protrusion.

10. The optical connector of claim 1, wherein:

the cover body includes a first cover body in which the through hole configured to communicate with the reception groove is formed and a second cover body having the through hole formed therein and the support protrusion formed thereon, the second cover body is coupled to the first cover body to be elastically moved with respect to the first cover body according to a position of the insertion protrusion in the through hole, and a movement groove in which the second cover body is elastically moved is formed in the receptacle body.

11. An optical connector comprising:

a receptacle assembly to be coupled to a substrate;

a cover coupled to the receptacle assembly;

a photoelectric element array coupled to the receptacle assembly; and a plug assembly inserted into a reception groove formed in the receptacle assembly and movably coupled to the receptacle assembly, wherein:

the plug assembly includes a plug body inserted into the reception groove to be movable between a first position spaced apart from the photoelectric element array and a second position connected to the photoelectric element array, and a hook member formed to protrude from the plug body, the cover includes a support member which presses the plug assembly in a first direction from the first position toward the second position and supports the plug assembly connected to the photoelectric element array, the receptacle assembly includes a receptacle body in which the reception groove is formed, a protruding member formed on the receptacle body to protrude toward the reception groove, and a hook groove formed in the protruding member, the hook member is inserted into the hook groove as the plug assembly is moved to the second position, and the protruding member supports the hook member inserted into the hook groove, the cover includes a cover body coupled to the receptacle assembly to be movable in the first direction and a second direction opposite the first direction, and a fixing member configured to fix the cover body, and the fixing member includes a through hole formed to pass through the cover body and a support protrusion formed on the cover body to protrude toward the through hole, the receptacle assembly includes a support groove formed in the receptacle body and a hook surface configured to support the support protrusion inserted into the support groove, the support protrusion is inserted into the support groove as the cover body is moved in the first direction, and the hook surface supports the support protrusion inserted into the support groove to fix the cover body.

12. The optical connector of claim 11, wherein the fixing member includes an elastic groove formed to pass through the cover body so that the support protrusion is elastically moved.

13. The optical connector of claim 11, wherein:

the support protrusion and the through hole are formed on and in a side wall of the cover body, the support groove is formed in an outer side wall of the receptacle body and an upper surface of the receptacle body, and the fixing member includes a release groove formed to pass through an upper surface of the cover body so that the support protrusion inserted into the support groove is spaced apart from the support groove.

14. The optical connector of claim 2, wherein:
the cover includes a passing hole formed to pass through the cover body to communicate with the reception groove, and an opening and closing member formed to protrude toward the passing hole, and
the opening and closing member is positioned at a closed position at which the insertion groove is blocked as the cover body is moved in the first direction, and is positioned at an open position at which the opening and closing member is spaced apart from the insertion groove as the cover body is moved in the second direction.

15. The optical connector of claim 1, wherein:
the photoelectric element array includes a connection member inserted into the plug body, and
the plug assembly includes a connection groove into which the connection member is inserted as the plug body is moved in the first direction.

16. The optical connector of claim 1, wherein:
the cover includes a pressing groove formed in the cover body so that the support member is elastically moved in the first direction and the second direction, and
the support member moves through the pressing groove in the second direction and presses the plug body in the first direction.

17. The optical connector of claim 1, wherein:
the cover includes a grip lever configured to move the cover body in the first direction and the second direction, and
the grip lever is formed to protrude from the cover body.

\* \* \* \* \*